United States Patent [19]

Nukada et al.

[11] Patent Number: 5,731,118

[45] Date of Patent: Mar. 24, 1998

[54] CHARGE TRANSPORTING RANDOM COPOLYESTER RESIN, PROCESS FOR PRODUCING THE SAME AND ORGANIC ELECTRONIC DEVICE USING THE SAME

[75] Inventors: Katsumi Nukada; Masahiro Iwasaki, both of Minami Ashigara, Japan

[73] Assignee: Fuji Xerox Co., Ltd., Tokyo, Japan

[21] Appl. No.: 701,663

[22] Filed: Aug. 22, 1996

[30] Foreign Application Priority Data

Aug. 25, 1995 [JP] Japan .................... 7-239057
Aug. 25, 1995 [JP] Japan .................... 7-239058

[51] Int. Cl.$^6$ .................................... G03G 5/087
[52] U.S. Cl. .................... 430/59; 430/96; 528/74
[58] Field of Search .................... 430/58, 59, 56, 430/96; 528/74

[56] References Cited

U.S. PATENT DOCUMENTS

| | | | |
|---|---|---|---|
| 4,801,517 | 1/1989 | Frechet et al. | 430/59 |
| 4,806,443 | 2/1989 | Yanus et al. | 430/59 |
| 4,806,444 | 2/1989 | Yanus et al. | 430/59 |
| 4,937,165 | 6/1990 | Ong et al. | 430/59 |
| 4,959,288 | 9/1990 | Ong et al. | 430/59 |
| 4,983,482 | 1/1991 | Ong et al. | 430/59 |
| 5,034,296 | 7/1991 | Ong et al. | 430/59 |
| 5,547,790 | 8/1996 | Umeda et al. | 430/59 |

FOREIGN PATENT DOCUMENTS

| | | |
|---|---|---|
| 59-28903 | 7/1984 | Japan . |
| 61-20953 | 1/1986 | Japan . |
| 1-134456 | 5/1989 | Japan . |
| 1-134457 | 5/1989 | Japan . |
| 1-134462 | 5/1989 | Japan . |
| 4-133065 | 5/1992 | Japan . |
| 4-133066 | 5/1992 | Japan . |
| 4-189873 | 7/1992 | Japan . |
| 5-43813 | 2/1993 | Japan . |
| 5-80550 | 4/1993 | Japan . |
| 5-98181 | 4/1993 | Japan . |
| 5-140472 | 6/1993 | Japan . |
| 5-140473 | 6/1993 | Japan . |
| 5-263007 | 10/1993 | Japan . |
| 5-279591 | 10/1993 | Japan . |

OTHER PUBLICATIONS

Preprints of 37th Meeting of Applied Physics Related Association, 31p-K-12 (1990).
The Sixth International Congress on Advances in Non-impact Printing Technologies, Oct. 21-26, 1990; pp. 306-311.
"Daiyonpan Jikken Kagaku Koza" (4th Institute of Experimental Chemistry), vol. 28, index and pp. 208-231 (1992).

Primary Examiner—John L. Goodrow
Attorney, Agent, or Firm—Oliff & Berridge, P.L.C.

[57] ABSTRACT

A charge transporting random copolyester resin comprising a repeating unit comprising at least one partial structural unit represented by formula (I-1) or (I-2), and at least one partial structural unit represented by formula (II) as a dicarboxylic acid component:

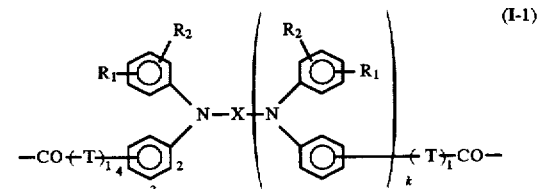

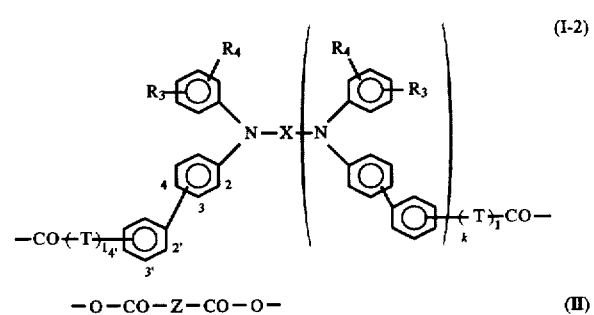

$$-O-CO-Z-CO-O- \qquad (II)$$

where the symbols in the above formulae are defined in the specification. A process for producing the same and an organic electronic device comprising the charge transporting random copolyester resin are also disclosed.

13 Claims, 10 Drawing Sheets

CHARGE TRANSPORTING RANDOM COPOLYESTER RESIN, PROCESS FOR PRODUCING THE SAME AND ORGANIC ELECTRONIC DEVICE USING THE SAME

FIELD OF THE INVENTION

The present invention relates to a novel charge transporting random copolyester resin capable of application to various organic electronic devices having excellent wear resistance and a long lifetime, such as an electrophotographic photoreceptor, an organic electroluminescence element and an organic electroconductive material, a process for producing the same and an organic electronic device using the charge transporting random copolyester resin, particularly an electrophotographic photoreceptor.

BACKGROUND OF THE INVENTION

Charge transporting polymers represented by polyvinylcarbazole (PVK) are promising as a photoconductive material for electrophotographic photoreceptors or, as reported in *Preprints of 37th Meeting of Applied Physics Related Association*, 31p-K-12 (1990), as an organic electroluminescence element material. These materials are formed into a layer and used as a charge transporting layer. As the material for forming a charge transporting layer, charge transporting polymers represented by PVK and small molecule-dispersed systems obtained by dispersing a charge transporting low molecular weight compound in a polymer are well known. In the case of an organic electroluminescence element material, the charge transporting material is usually vacuum deposited. Among the above-described materials, the small molecule-dispersed systems are predominantly used particularly for electrophotographic photoreceptors because of diversity in materials and ease in achieving high function devices.

With respect to the electrophotographic photoreceptor, organic photoreceptors having high performance are advancing in recent years and to cope with it, high-speed copying machines and printers are being used. However, when applied to high-speed copying machines or printers, the performance of the electrophotographic photoreceptor currently achieved is not necessarily satisfied. In particular, organic photoreceptors having a longer lifetime are keenly demanded. One of important factors decisive of the lifetime of an organic photoreceptor is abrasion of the charge transporting layer. At present, so-called laminate-type organic photoreceptors having a photosensitive layer comprising a charge generating layer having laminated thereon a charge transporting layer are predominating. In that case, the charge transporting layer often serves as the outermost layer of the photosensitive layer. A charge transporting layer using a small molecule-dispersed system, which is predominantly used at present, having satisfactory electrical characteristics have been produced. However, the charge transporting layer is inherently vulnerable to abrasion because the charge transporting layer is composed of a binder resin having dispersed therein a low molecular weight compound so that the original mechanical properties of the binder resin is deteriorated.

Under these circumstances, the charge transporting polymer provides a possibility that the above-described defect can be greatly improved and is now being extensively investigated. For example, U.S. Pat. No. 4,806,443 discloses polycarbonate obtained by polymerization of a specific dihydroxyarylamine with bischloroformate; U.S. Pat. No. 4,806,444 discloses polycarbonate obtained by polymerization of a specific dihydroxyarylamine with phosgene; U.S. Pat. No. 4,801,517 discloses polycarbonate obtained by polymerization of bishydroxyalkylarylamine with bischloroformate or phosgene; U.S. Pat. Nos. 4,937,165 and 4,959,288 disclose polycarbonate obtained by polymerization of a specific dihydroxyarylamine or bishydroxyalkylarylamine with bischloroformate, or polyester obtained by polymerization with a bisacyl halide; U.S. Pat. No. 5,034,296 discloses polycarbonate or polyester of an arylamine having a specific fluorenone skeleton; U.S. Pat. No. 4,983,482 discloses polyurethane; JP-B-59-28903 (the term "JP-B" as used herein means an "examined Japanese patent publication") discloses polyester having a specific bisstyrylbisarylamine as a main chain; and JP-A-61-20953 (the term "JP-A" as used herein means an "unexamined published Japanese patent application"), JP-A-1-134456, JP-A-1-134457, JP-A-1-134462, JP-A-4-133065 and JP-A-4-133066 propose polymers having a charge transporting substituent such as hydrazone or triarylamine, as a pendant and photoreceptors using the polymer. In particular, polymers having a tetraarylbenzidine skeleton exhibit high mobility and have high practical utility as reported in *The Sixth International Congress on Advances in Non-impact Printing Technologies*, 306 (1990).

Charge transporting polymers are required to have various properties such as solubility, mobility and matching of oxidation potential and in order to satisfy these requirements, a substituent is generally introduced in a charge transporting polymer to control the physical properties. The charge transporting monomer is almost decisive of the ionizing potential of the charge transporting polymer. Therefore, it is an important that the ionizing potential of the charge transporting monomer can be controlled. The monomer as a raw material of the above-described triarylamine polymer may be roughly classified into two groups, namely, (1) dihydoxyarylamine and (2) bishydroxyalkylarylamine. A dihydroxyarylamines is readily oxidized because of having an aminophenol structure so that purification of a dihydroxyarylamine is difficult. In particular, a dihydroxyarylamine having a para-hydroxy-substituted structure is more unstable. Thus, it is difficult to control the ionizing potential of the dihydroxyarylamine monomer by changing the substituent site. Furthermore, since the monomers have a structure where the oxygen is directly substituted on the aromatic ring, the charge distribution tends to be unbalanced due to their electron-withdrawing property so that the mobility is disadvantageously decreased. On the other hand, the bishydroxyalkylarylamine can be free from effects by the electron-withdrawing property of oxygen owing to the methylene group; however, synthesis of the monomer is difficult. More specifically, in the reaction of diarylamine or diarylbenzidine with 3-bromoiodobenzene, both bromine and iodine are reactive and the product is apt to be a mixture, resulting in reduction in the yield. Alkyl lithium, which is used for lithiation of bromine, or ethylene oxide, is highly hazardous and toxic and must be handled with care.

In order to solve the above-described problems, the present inventors had made an investigation before on the charge transporting polymer and proposed novel alternately copolymerized high performance charge transporting polymers represented by the following formula (IV) or (V):

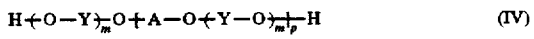
(IV)

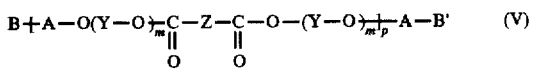

$$B + A - O(Y - O)_{m'} \overset{\|}{\underset{O}{C}} - Z - \overset{\|}{\underset{O}{C}} - O - (Y - O)_{m'p} A - B' \quad (V)$$

wherein Y and Z each represents a divalent hydrocarbon group; A represents a structure represented by formula (I-1) or (I-2); B and B' each independently represents —O—(Y'—O)$_{m'}$—H or —O—(Y'—O)$_{m'}$—CO—Z'—CO—OR' (wherein R' represents a hydrogen atom, an alkyl group, a substituted or unsubstituted aryl group or a substituted or unsubstituted aralkyl group; Y' and Z' each represents a divalent hydrocarbon group; and m' represents an integer of from 1 to 5); m represents an integer of from 1 to 5; and p represents an integer of from 5 to 5,000.

The above-described charge transporting polymers exhibit excellent properties as compared with conventional polymers and have high practical utility. However, in the polymer represented by formula (IV), the charge transporting function moiety (Moiety A) is present at a high proportion and the polymer is disadvantageously readily affected by a discharge product such as ozone. In the polymer represented by formula (V), the proportion of charge transporting function moieties (Moiety A) is reduced and accordingly, durability against a discharge product such as ozone is high, however, since the production process thereof is alternate copolymerization and the ratio of Moiety A to Moiety Z is constant, reduction in the mobility is readily caused due to too much lowered proportion of Moiety A and polymers having a high molecular weight can be difficultly obtained. Further, when taken account of application to various devices, the degree of freedom in designing the device must be large, and capability of suitable control of mechanical properties, oxidation resistance or charge injection property is required.

SUMMARY OF THE INVENTION

The present invention has been made to overcome the above-described problems encountered in conventional techniques.

An object of the present invention is to provide a novel charge transporting polyester resin having excellent wear resistance and a long lifetime.

Another object of the present invention is to provide a novel charge transporting polyester resin which can be readily modified to control mechanical properties, antioxidation property and charge injection property, and can be easily synthesized.

Still another object of the present invention is to provide a simple process for producing a novel charge transporting polyester resin.

An object of the present invention is to provide an organic electronic device using a novel charge transporting polyester resin having a large degree of freedom in mechanical properties, oxidation resistance or charge injection property, and capable of easy production.

As a result of extensive investigations on the charge transporting polymer, the present inventors have found that in the random copolymerized charge transporting polyester resin having at least one structure represented by the following formula (I-1) or (I-2) and at least one dicarboxylic acid component represented by the following formula (II) as partial structures of the repeating unit, more specifically, a random copolymer represented by the following formula (III) having at least one structure represented by formula (I-1) or (I-2) and at least one dicarboxylic acid component represented by formula (II) as partial structure of the repeating unit, the ratio of Moiety A to Moiety Z in the copolymer can be easily changed and further, the mechanical properties, oxidation resistance and charge injection property of the random copolymer can be easily controlled by selecting appropriate structures for Moiety A and Moiety Z, respectively. Furthermore, the present inventors have found that the charge transporting polyester resin can be easily produced by mixing a dicarboxylic acid derivative having a structure represented by formula (I-1) or (I-2) with a dicarboxylic acid derivative having a structure represented by formula (II) at a desired proportion and polymerizing the mixture. The present invention has been accomplished based on these findings.

The novel charge transporting polyester resin of the present invention for use in an organic electronic device is a random copolymerized charge transporting polyester resin having at least one partial structural unit represented by the following formula (I-1) or (I-2) and at least one partial structural unit represented by the following formula (II) as a dicarboxylic acid component:

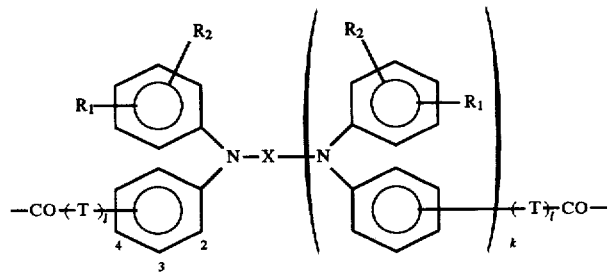

(I-1)

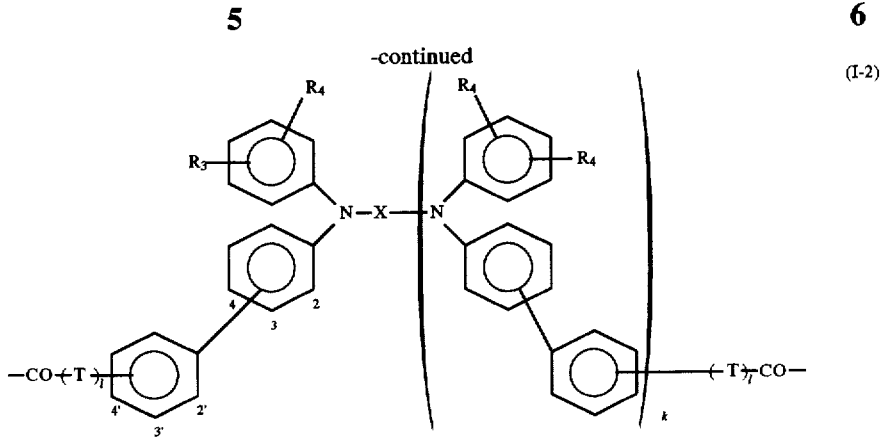

(I-2)

wherein R₁ to R₄ each independently represents a hydrogen atom, an alkyl group having from 1 to 4 carbon atoms, an alkoxy group having from 1 to 4 carbon atoms, a substituted amino group (e.g., dimethylamino, diethylamino and diphenylamino), a halogen atom or a substituted or unsubstituted aryl group (e.g., phenyl, biphenyl and naphthyl; examples of the substituent for aryl group include methyl, ethyl, methoxy and ethoxy); X represents a substituted or unsubstituted divalent aromatic group; T represents a linear or branched divalent hydrocarbon group having from 1 to 10 carbon atoms; and k and l each represents 0 or 1;

(II)

wherein Z represents a divalent hydrocarbon group.

The charge transporting polyester resin of the present invention for use in an organic electronic device is preferably a random copolymer represented by the following formula (III):

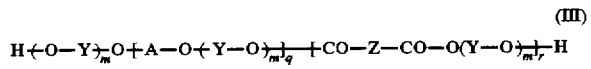
(III)

wherein A represents a structure represented by formula (I-1) or (I-2) above; Y and Z each represents a divalent hydrocarbon group; m represents an integer of from 1 to 5; q represents an integer of 1 or greater; and r represents an integer of from 1 to 3,500, provided that q+r is an integer of from 5 to 5,000 and 0.3≦q/(q+r)<1.

The process for producing the charge transporting random copolyester resin is characterized by synthesizing by means of transesterification using a dicarboxylic acid ester having at least one structure represented by the above formula (I-1) or (I-2), a dicarboxylic acid ester having at least one structure represented by the above formula (II), and a diol having a structure represented by H—(O—Y)ₘ—OH.

DETAILED DESCRIPTION OF THE INVENTION

Figure 1:
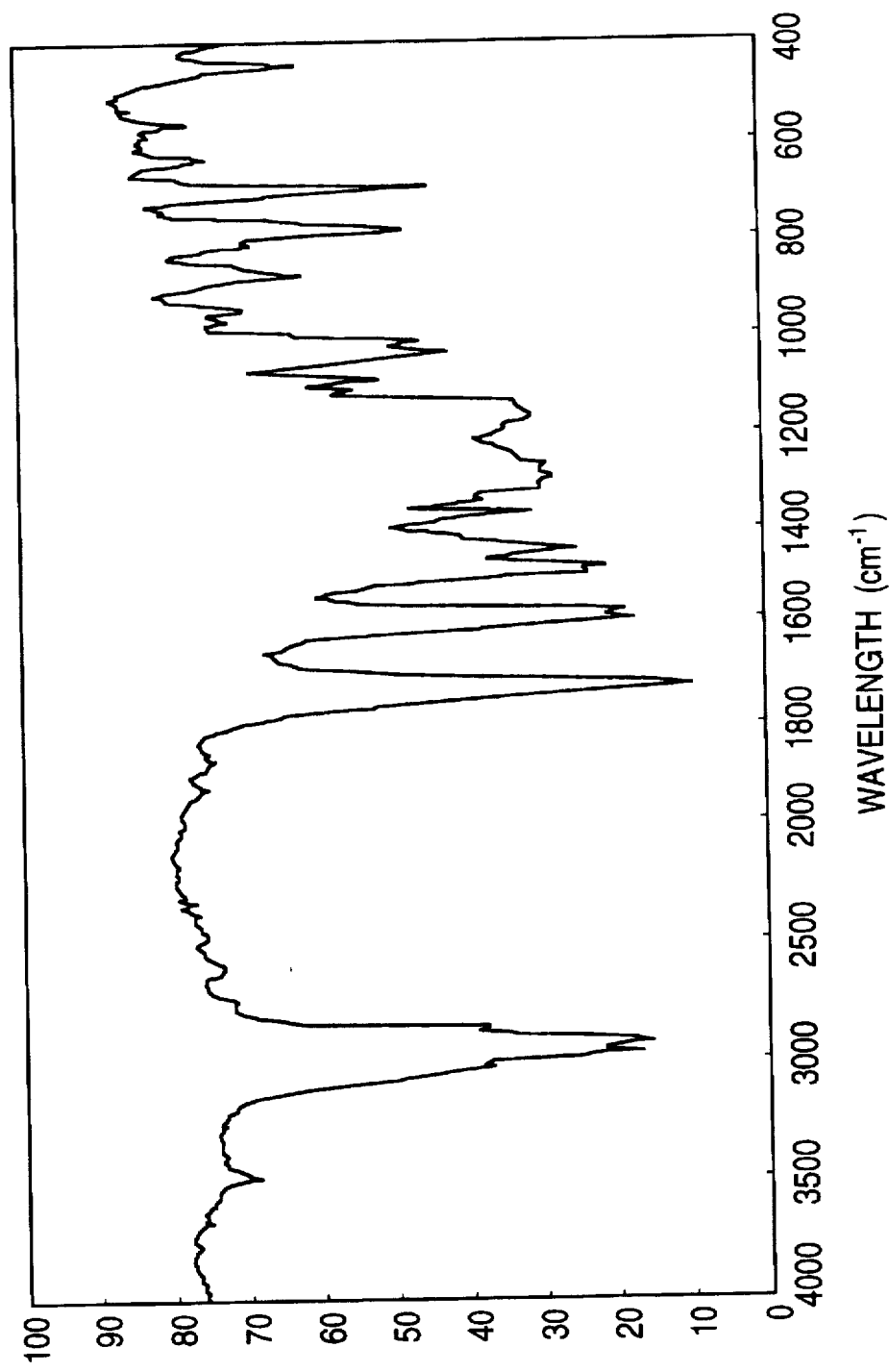
FIG. 1 is an IR spectrum of the monomer prepared in Preparation Example 1.

The practical embodiment of the present invention is described in detail.

Specific structural examples of T in the structure represented by formula (I-1) or (I-2) contained as a partial structural unit in the repeating unit of the charge transporting polyester resin of the present invention for use in an organic electronic device are set forth below.

In the above formulae, the arylamine skeleton may be bonded to either side. For example, T-5R indicates that the arylamine skeleton is bonded to the right side of the structure T-5, and T-5L indicates that the arylamine skeleton is bonded to the left side of the structure T-5.

 T-1

 T-2

 T-3

 T-4

 T-5

 T-6

 T-7

 T-8

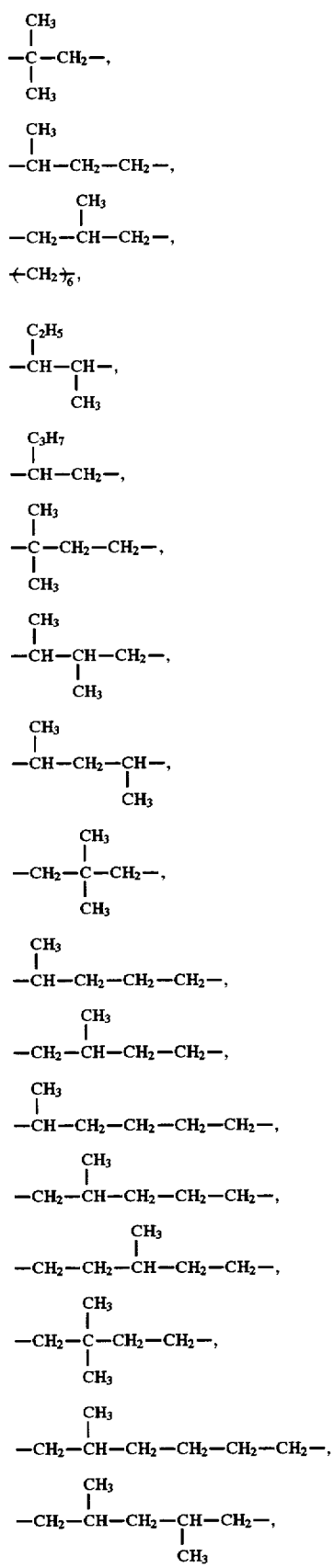
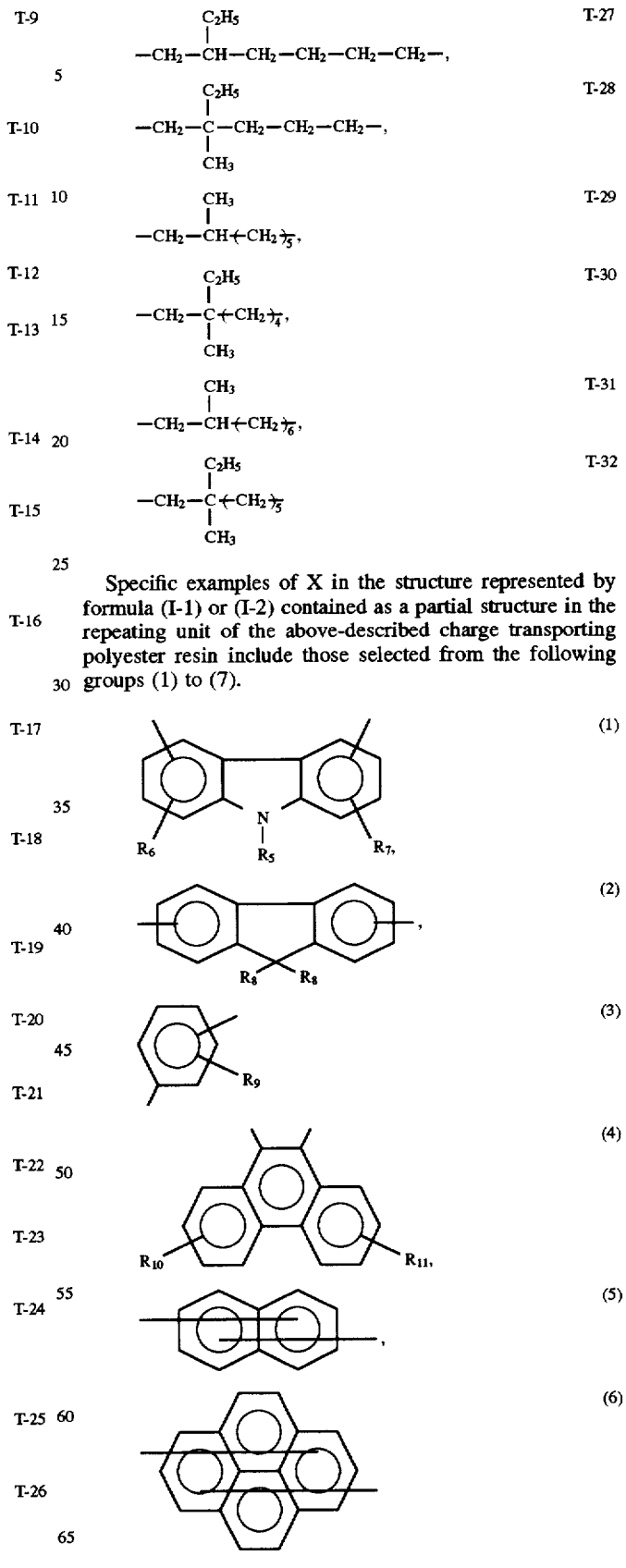
Specific examples of X in the structure represented by formula (I-1) or (I-2) contained as a partial structure in the repeating unit of the above-described charge transporting polyester resin include those selected from the following groups (1) to (7).

-continued

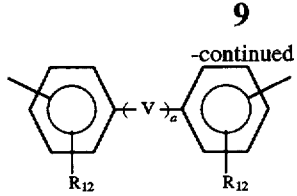 (7)

wherein $R_5$ represents a hydrogen atom, an alkyl group having from 1 to 4 carbon atoms, a substituted or unsubstituted phenyl group, or a substituted or unsubstituted aralkyl group having from 7 to 15 carbon atoms

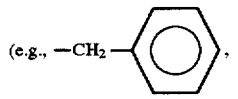

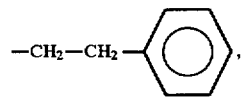

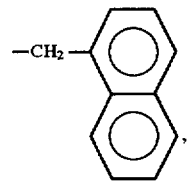

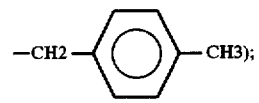

$R_6$ to $R_{12}$ each represents a hydrogen atom, an alkyl group having from 1 to 4 carbon atoms, an alkoxy group having from 1 to 4 carbon atoms, a substituted or unsubstituted phenyl group, a substituted or unsubstituted aralkyl group having from 7 to 15 carbon atoms

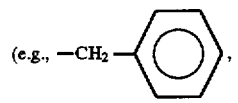

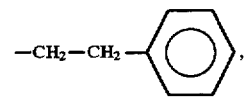

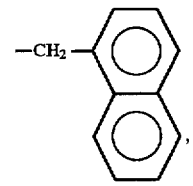

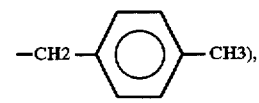

or a halogen atom; examples of the substituent for the phenyl or aralkyl group represented by $R_5$ to $R_{12}$ include methyl, ethyl, methoxy and ethoxy; a represents 0 or 1; and V represents one selected from the following groups (8) to (17):

$-(CH_2)_b-$, (8)

$-C(CH_3)_2-$, (9)

$-O-$, (10)

$-S-$, (11)

 (12)

 (13)

$-C(CF_3)_2-$, (14)

$-Si(CH_3)_2-$, (15)

$-CH=CH-$, (16)

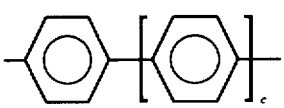 (17)

wherein b represents an integer of from 1 to 10 and c represents an integer of from 1 to 3.

Biphenyl or 3,3'-dimethylbiphenyl group is preferred for X.

Examples of Y and Z in the charge transporting polyester resin represented by formula (III) of the present invention include those selected from the following groups (18) to (24).

$-(CH_2)_d-$, (18)

$-(CH_2CH_2O)_e-(CH_2CH_2)-$, (19)

 (20)

 (21)

 (22)

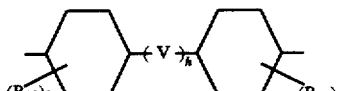 (23)

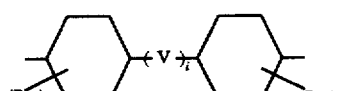 (24)

wherein $R_{13}$ and $R_{14}$ each represents a hydrogen atom, an alkyl group having from 1 to 4 carbon atoms, an alkoxy group having from 1 to 4 carbon atoms, a substituted or unsubstituted phenyl group, a substituted or unsubstituted aralkyl group having from 7 to 15 carbon atoms

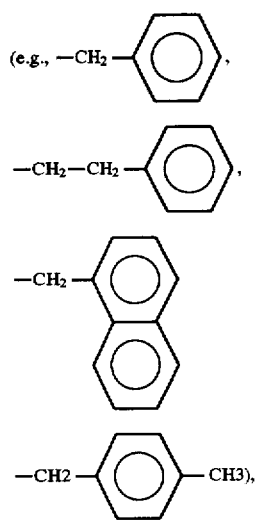

or a halogen atom; examples of the substituent for the phenyl or aralkyl group represented by $R_{13}$ and $R_{14}$ include methyl, ethyl, methoxy and ethoxy; d and e each represents an integer of from 1 to 10; f and g each represents an integer of from 0 to 2; h and i each represents 0 or 1; and V has the same meaning as defined above.

Examples of the partial structure represented by formula (I-1) contained as a partial structural unit of the repeating unit in the charge transporting polyester resin of the present invention are shown in Tables 1 to 5 below, examples of the partial structural unit represented by formula (I-2) are shown in Tables 6 to 10 below, however, the present invention is by no means limited thereto.

Further, specific examples of the charge transporting random copolyester resin represented by formula (III) of the present invention are shown in Tables 11 to 14 below, however, the present invention is by no means limited thereto.

TABLE 1

Partial Structure of Formula (I-1)

| Structure | X | $R_1$ | $R_2$ | Bonded Site | k | T |
|---|---|---|---|---|---|---|
| 1 | (phenyl, bonded at top) | H | H | 3 | 0 | T-2 |
| 2 | (phenyl, bonded at side) | H | H | 3 | 0 | T-2 |
| 3 | (phenyl, bonded at top) | 3-CH$_3$ | 4-CH$_3$ | 3 | 0 | T-2 |
| 4 | (phenyl, bonded at side) | 3-CH$_3$ | 4-CH$_3$ | 4 | 0 | T-2 |
| 5 | (biphenyl) | H | H | 3 | 1 | — |
| 6 | (biphenyl) | H | H | 3 | 1 | T-2 |
| 7 | (biphenyl) | H | H | 3 | 1 | T-5L |
| 8 | (biphenyl) | H | 4-CH$_3$ | 3 | 1 | T-2 |

TABLE 1-continued
Partial Structure of Formula (I-1)
| Structure | X | R₁ | R₂ | Bonded Site | k | T |
|---|---|---|---|---|---|---|
| 9 | 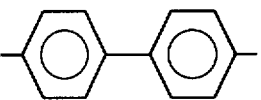 | H | 4-C₆H₅ | 3 | 1 | T-2 |
| 10 | 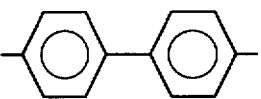 | 3-CH₃ | 4-CH₃ | 3 | 1 | T-8 |
| 11 | 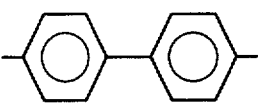 | 3-CH₃ | 4-CH₃ | 3 | 1 | T-25L |
| 12 | 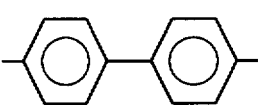 | H | H | 4 | 1 | T-5R |
| 13 | 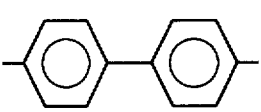 | H | H | 4 | 1 | T-1 |
| 14 | 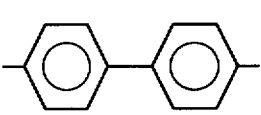 | H | H | 4 | 1 | T-2 |
TABLE 2
| Structure | X | R₁ | R₂ | Bonded Site | k | T |
|---|---|---|---|---|---|---|
| 15 | 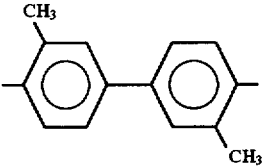 | 3-CH₃ | 4-CH₃ | 3 | 1 | — |
| 16 | 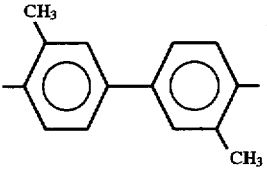 | H | H | 3 | 1 | T-2 |
| 17 | 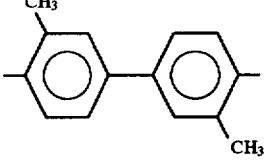 | H | 4-CH₃ | 3 | 1 | T-2 |

TABLE 2-continued

| Structure | X | R₁ | R₂ | Bonded Site | k | T |
|---|---|---|---|---|---|---|
| 18 | CH₃-biphenyl-CH₃ | 3-CH₃ | 4-CH₃ | 4 | 1 | T-1 |
| 19 | CH₃-biphenyl-CH₃ | 3-CH₃ | 4-CH₃ | 4 | 1 | T-2 |
| 20 | CH₃-biphenyl-CH₃ | 3-CH₃ | 4-CH₃ | 4 | 1 | T-4 |
| 21 | CH₃-biphenyl-CH₃ | 3-CH₃ | 5-CH₃ | 4 | 1 | T-2 |
| 22 | CH₃-biphenyl-CH₃ | H | 4-OCH₃ | 4 | 1 | T-2 |

TABLE 3

| Structure | X | R₁ | R₂ | Bonded Site | k | T |
|---|---|---|---|---|---|---|
| 23 | CH₃-biphenyl-CH₃ | 4-CH₃ | H | 4 | 1 | T-13L |
| 24 | CH₃O-biphenyl-OCH₃ | H | H | 3 | 1 | — |

TABLE 3-continued
| Structure | X | R₁ | R₂ | Bonded Site | k | T |
|---|---|---|---|---|---|---|
| 25 | 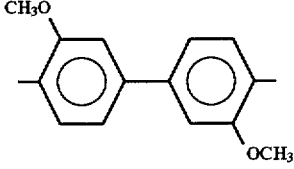 | H | H | 3 | 1 | T-2 |
| 26 | 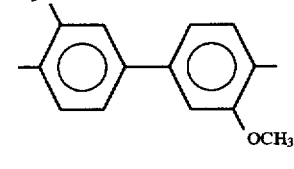 | H | 4-CH₃ | 3 | 1 | T-2 |
| 27 | 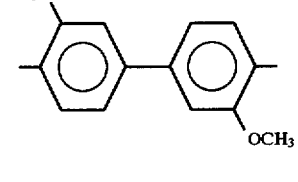 | H | 4-C₆H₅ | 3 | 1 | T-2 |
| 28 | 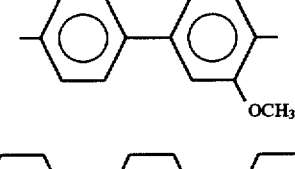 | 3-CH₃ | 4-CH₃ | 3 | 1 | T-8 |
| 29 |  | H | 4-CH₃ | 3 | 1 | T-2 |
TABLE 4
| Structure | X | R₁ | R₂ | Bonded Site | k | T |
|---|---|---|---|---|---|---|
| 30 |  | H | 4-CH₃ | 4 | 1 | T-2 |
| 31 |  | 3-CH₃ | 4-CH₃ | 4 | 1 | T-2 |
| 32 |  | 3-CH₃ | 5-CH₃ | 4 | 1 | T-2 |
| 33 | 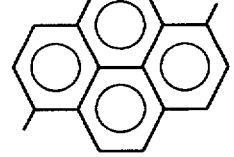 | H | H | 3 | 1 | T-2 |

TABLE 4-continued

| Structure | X | R₁ | R₂ | Bonded Site | k | T |
|---|---|---|---|---|---|---|
| 34 | (pyrene structure) | H | 4-CH₃ | 3 | 1 | T-8 |
| 35 | (pyrene structure) | 3-CH₃ | 4-CH₃ | 3 | 1 | T-18 |
| 36 | (pyrene structure) | H | H | 4 | 1 | T-20L |
| 37 | (pyrene structure) | 4-CH₃ | H | 4 | 1 | T-24L |

TABLE 5

| Structure | X | R₁ | R₂ | Bonded Site | k | T |
|---|---|---|---|---|---|---|
| 38 | (9,9-dimethylfluorene) | H | H | 3 | 1 | T-2 |
| 39 | (9,9-dimethylfluorene) | H | 4-CH₃ | 3 | 1 | T-8 |
| 40 | (9,9-dimethylfluorene) | 3-CH₃ | 4-CH₃ | 3 | 1 | T-18 |
| 41 | (9,9-dimethylfluorene) | H | H | 4 | 1 | T-20L |
| 42 | (9,9-dimethylfluorene) | 4-CH₃ | H | 4 | 1 | T-24L |

TABLE 6
Partial Structure of Formula (I-2)
| Structure | X | R₃ | R₄ | Bonded Site | k | T |
|---|---|---|---|---|---|---|
| 43 | 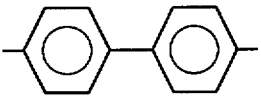 | H | H | 4, 4' | 0 | T-1 |
| 44 | 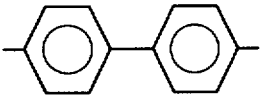 | H | H | 4, 4' | 0 | T-2 |
| 45 | 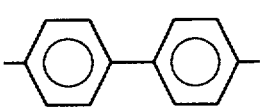 | 3-CH₃ | 4-CH₃ | 4, 4' | 0 | — |
| 46 | 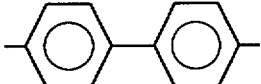 | 3-CH₃ | 4-CH₃ | 4, 4' | 0 | T-2 |
| 47 | 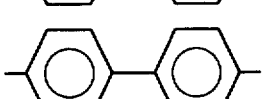 | H | H | 4, 4' | 1 | T-1 |
| 48 | 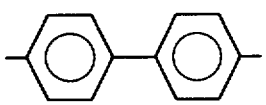 | H | H | 4, 4' | 1 | T-2 |
| 49 |  | H | H | 4, 4' | 1 | T-5L |
| 50 | 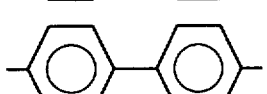 | H | 4-CH₃ | 4, 4' | 1 | T-2 |
| 51 |  | H | 4-C₆H₅ | 4, 4' | 1 | T-2 |
| 52 | 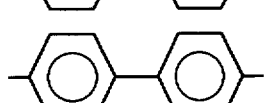 | 3-CH₃ | 4-CH₃ | 4, 4' | 1 | T-8 |
| 53 |  | 3-CH₃ | 4-CH₃ | 4, 4' | 1 | T-25L |
| 54 |  | H | H | 4, 4' | 1 | T-5R |
| 55 |  | 3-CH₃ | 4-CH₃ | 4, 4' | 1 | T-1 |
| 56 | 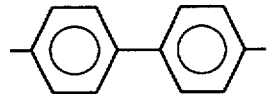 | 4-CH₃ | H | 4, 4' | 1 | T-2 |

TABLE 7

| Structure | X | $R_3$ | $R_4$ | Bonded Site | k | T |
|---|---|---|---|---|---|---|
| 57 | (dimethylbiphenyl) | H | H | 4, 4' | 1 | — |
| 58 | (dimethylbiphenyl) | H | H | 4, 4' | 1 | T-2 |
| 59 | (dimethylbiphenyl) | H | 4-$CH_3$ | 4, 4' | 1 | T-2 |
| 60 | (dimethylbiphenyl) | H | 4-$C_6H_5$ | 4, 4' | 1 | T-1 |
| 61 | (dimethylbiphenyl) | 3-$CH_3$ | 4-$CH_3$ | 4, 4' | 1 | T-2 |
| 62 | (dimethylbiphenyl) | 3-$CH_3$ | 4-$CH_3$ | 4, 4' | 1 | T-4 |
| 63 | (dimethylbiphenyl) | H | H | 4, 4' | 1 | T-5R |
| 64 | (dimethylbiphenyl) | 3-$CH_3$ | 4-$CH_3$ | 4, 4' | 1 | T-5L |

TABLE 8

| Structure | X | R₃ | R₄ | Bonded Site | k | T |
|---|---|---|---|---|---|---|
| 65 | 2-CH₃, 3'-CH₃ biphenyl | 4-CH₃ | H | 4, 4' | 1 | T-13L |
| 66 | 2-CH₃O, 3'-OCH₃ biphenyl | H | H | 4, 4' | 1 | — |
| 67 | 3-CH₃O, 3'-OCH₃ biphenyl | H | H | 4, 4' | 1 | T-2 |
| 68 | 3-CH₃O, 3'-OCH₃ biphenyl | H | 4-CH₃ | 4, 4' | 1 | T-2 |
| 69 | 3-CH₃O, 3'-OCH₃ biphenyl | H | 4-C₆H₅ | 4, 4' | 1 | T-2 |
| 70 | 3-CH₃O, 3'-OCH₃ biphenyl | 3-CH₃ | 4-CH₃ | 4, 4' | 1 | T-8 |
| 71 | terphenyl | H | 4-CH₃ | 4, 4' | 1 | T-2 |

TABLE 9

| Structure | X | R₃ | R₄ | Bonded Site | k | T |
|---|---|---|---|---|---|---|
| 72 | terphenyl | 3-CH₃ | 4-CH₃ | 4, 4' | 1 | T-2 |
| 73 | terphenyl | 3-CH₃ | 5-CH₃ | 4, 4' | 1 | T-2 |

TABLE 9-continued
| Structure | X | $R_3$ | $R_4$ | Bonded Site | k | T |
|---|---|---|---|---|---|---|
| 74 |  | H | 4-CH$_3$ | 4, 4' | 1 | T-5L |
| 75 | 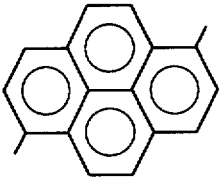 | H | H | 4, 4' | 1 | T-2 |
| 76 | 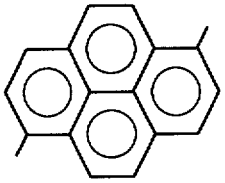 | H | 4-CH$_3$ | 4, 4' | 1 | T-8 |
| 77 | 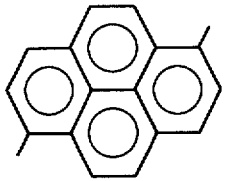 | 3-CH$_3$ | 4-CH$_3$ | 4, 4' | 1 | T-18 |
| 78 | 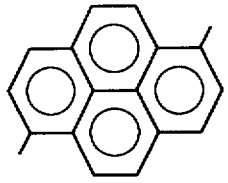 | H | H | 4, 4' | 1 | T-20L |
| 79 | 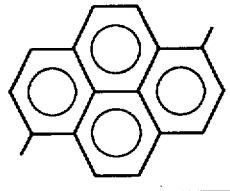 | 4-CH$_3$ | H | 4, 4' | 1 | T-24L |
TABLE 10
| Structure | X | $R_3$ | $R_4$ | Bonded Site | k | T |
|---|---|---|---|---|---|---|
| 80 | 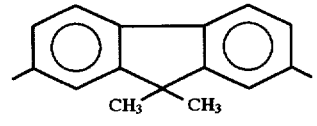 | H | H | 4, 4' | 1 | T-2 |
| 81 | 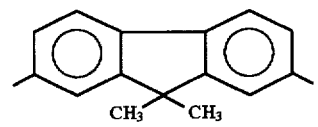 | H | 4-CH$_3$ | 4, 4' | 1 | T-8 |

TABLE 10-continued

| Structure | X | $R_3$ | $R_4$ | Bonded Site | k | T |
|---|---|---|---|---|---|---|
| 82 |  | 3-$CH_3$ | 4-$CH_3$ | 4, 4' | 1 | T-18 |
| 83 | 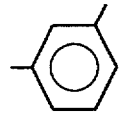 | H | H | 4, 4' | 1 | T-20L |
| 84 | 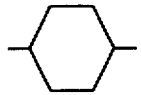 | 4-$CH_3$ | H | 4, 4' | 1 | T-24L |

TABLE 11

Charge Transporting Polyester Resin of Formula (III)

| Compound | Partial Structure (A) | | Y | m | Z | q | r |
| | Structure | Ratio | | | | | |
|---|---|---|---|---|---|---|---|
| CTP-1 | 3 | — | $-CH_2CH_2-$ | 1 | $\text{\textendash}(CH_2)_4\text{\textendash}$ | 140 | 35 |
| CTP-2 | 3 | — | $-CH_2CH_2-$ | 2 | $\text{\textendash}(CH_2)_4\text{\textendash}$ | 55 | 10 |
| CTP-3 | 3 | — | $-CH_2CH_2-$ | 1 | $\text{\textendash}(CH_2)_8\text{\textendash}$ | 150 | 30 |
| CTP-4 | 3 | — | $-CH_2CH_2-$ | 1 | phenylene | 90 | 60 |
| CTP-5 | 3 | — | $-CH_2CH_2-$ | 1 | methylphenylene | 110 | 70 |
| CTP-6 | 6 | — | $-CH_2CH_2-$ | 1 | $\text{\textendash}(CH_2)_2\text{\textendash}$ | 110 | 40 |
| CTP-7 | 6 | — | $-CH_2CH_2-$ | 1 | $\text{\textendash}(CH_2)_4\text{\textendash}$ | 85 | 85 |
| CTP-8 | 6 | — | $-CH_2CH_2-$ | 2 | $\text{\textendash}(CH_2)_8\text{\textendash}$ | 35 | 35 |
| CTP-9 | 6 | — | $-CH_2CH_2-$ | 1 | cyclohexylene | 80 | 40 |
| CTP-10 | 11 | — | $-CH_2CH_2CH_2-$ | 1 | $\text{\textendash}(CH_2)_4\text{\textendash}$ | 60 | 30 |
| CTP-11 | 11 | — | $-CH_2CH_2-$ | 1 | $\text{\textendash}(CH_2)_8\text{\textendash}$ | 130 | 30 |
| CTP-12 | 18 | — | $-CH_2CH_2-$ | 1 | $\text{\textendash}(CH_2)_2\text{\textendash}$ | 130 | 10 |
| CTP-13 | 18 | — | $-CH_2CH_2-$ | 1 | $\text{\textendash}(CH_2)_{10}\text{\textendash}$ | 115 | 50 |

TABLE 11-continued

Charge Transporting Polyester Resin of Formula (III)

| Compound | Partial Structure (A) Structure | Ratio | Y | m | Z | q | r |
|---|---|---|---|---|---|---|---|
| CTP-14 | 19 | — | —CH₂CH₂— | 1 | ⁺(CH₂)₂ | 120 | 30 |
| CTP-15 | 19 | — | —CH₂CH₂— | 1 | ⁺(CH₂)₄ | 145 | 125 |
| CTP-16 | 19 | — | —CH₂CH₂— | 1 | ⁺(CH₂)₈ | 160 | 105 |
| CTP-17 | 19 | — | —CH₂CH₂— | 1 | 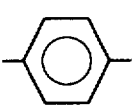 | 150 | 120 |
| CTP-18 | 19 | — | —CH₂CH₂— | 1 | 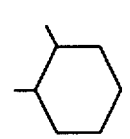 | 110 | 40 |

TABLE 12

| Compound | Partial Structure (A) Structure | Ratio | Y | m | Z | q | r |
|---|---|---|---|---|---|---|---|
| CTP-19 | 20 | — | —CH₂CH₂— | 1 | ⁺(CH₂)₄ | 140 | 35 |
| CTP-20 | 20 | — | —CH₂CH₂— | 2 | ⁺(CH₂)₄ | 65 | 15 |
| CTP-21 | 21 | — | —CH₂CH₂— | 1 | ⁺(CH₂)₂ | 150 | 30 |
| CTP-22 | 21 | — | —CH₂CH₂— | 1 | ⁺(CH₂)₄ | 90 | 60 |
| CTP-23 | 21 | — | —CH₂CH₂— | 1 | ⁺(CH₂)₈ | 110 | 70 |
| CTP-24 | 21 | — | —CH₂CH₂— | 1 | 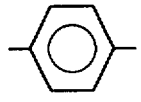 | 110 | 40 |
| CTP-25 | 21 | — | —CH₂CH₂— | 1 | 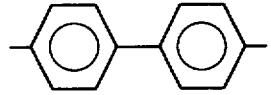 | 85 | 85 |
| CTP-26 | 22 | — | —CH₂CH₂— | 2 | ⁺(CH₂)₁₀ | 45 | 35 |
| CTP-27 | 30 | — | —CH₂CH₂— | 1 | ⁺(CH₂)₈ | 80 | 40 |
| CTP-28 | 31 | — | —CH₂CH₂— | 1 | 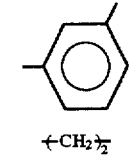 | 60 | 30 |
| CTP-29 | 31 | — | —CH₂CH₂— | 1 | ⁺(CH₂)₂ | 130 | 30 |

TABLE 12-continued

| Compound | Partial Structure (A) | | Y | m | Z | q | r |
|---|---|---|---|---|---|---|---|
| | Structure | Ratio | | | | | |
| CTP-30 | 31 | — | —CH₂CH₂— | 1 | ⁺(CH₂)₄ | 130 | 10 |
| CTP-31 | 35 | — | —CH₂CH₂— | 1 | ⁺(CH₂)₄ | 115 | 50 |
| CTP-32 | 35 | — | —CH₂CH₂— | 1 | ⁺(CH₂)₆ | 120 | 30 |
| CTP-33 | 38 | — | —CH₂CH₂— | 1 | ⁺(CH₂)₈ | 60 | 20 |
| CTP-34 | 38 | — | —CH₂CH₂— | 3 | ⁺(CH₂)₈ | 35 | 35 |
| CTP-35 | 46 | — | —CH₂CH₂CH₂— | 1 | ⁺(CH₂)₈ | 80 | 60 |
| CTP-36 | 46 | — | —CH₂CH₂— | 1 | ⁺(CH₂)₆ | 110 | 40 |

TABLE 13

| Compound | Partial Structure (A) | | Y | m | Z | q | r |
|---|---|---|---|---|---|---|---|
| | Structure | Ratio | | | | | |
| CTP-37 | 47 | — | —CH₂CH₂— | 1 | ⁺(CH₂)₄ | 140 | 35 |
| CTP-38 | 47 | — | —CH₂CH₂— | 2 | ⁺(CH₂)₄ | 85 | 55 |
| CTP-39 | 47 | — | —CH₂CH₂— | 1 | ⁺(CH₂)₈ | 150 | 30 |
| CTP-40 | 48 | — | —CH₂CH₂— | 1 | ⁺(CH₂)₂ | 90 | 60 |
| CTP-41 | 48 | — | —CH₂CH₂— | 1 | ⁺(CH₂)₄ | 110 | 70 |
| CTP-42 | 48 | — | —CH₂CH₂— | 1 | ⁺(CH₂)₈ | 110 | 40 |
| CTP-43 | 48 | — | —CH₂CH₂— | 1 |  | 85 | 85 |
| CTP-44 | 61 | — | —CH₂CH₂— | 2 | ⁺(CH₂)₄ | 45 | 45 |
| CTP-45 | 61 | — | —CH₂CH₂— | 1 | ⁺(CH₂)₈ | 80 | 40 |
| CTP-46 | 61 | — | —CH(CH₃)CH₂— | 1 |  | 60 | 30 |
| CTP-47 | 62 | — | —CH₂CH₂— | 1 | ⁺(CH₂)₄ | 130 | 30 |
| CTP-48 | 62 | — | —CH₂CH₂— | 1 | ⁺(CH₂)₁₀ | 130 | 10 |
| CTP-49 | 71 | — | —CH₂CH₂— | 1 | ⁺(CH₂)₄ | 115 | 50 |

TABLE 13-continued

| Compound | Partial Structure (A) | | Y | m | Z | q | r |
| --- | --- | --- | --- | --- | --- | --- | --- |
| | Structure | Ratio | | | | | |
| CTP-50 | 71 | — | —CH₂CH₂— | 1 | ⁺(CH₂)₆ | 120 | 30 |
| CTP-51 | 72 | — | —CH₂CH₂— | 1 | ⁺(CH₂)₈ | 60 | 20 |
| CTP-52 | 72 | — | —CH₂CH₂— | 1 | cyclohexylene | 80 | 40 |
| CTP-53 | 73 | — | —CH₂CH₂CH₂— | 1 | ⁺(CH₂)₄ | 80 | 60 |
| CTP-54 | 73 | — | —CH₂CH₂— | 1 | ⁺(CH₂)₆ | 110 | 40 |

TABLE 14

| Compound | Partial Structure (A) | | Y | m | Z | q | r |
| --- | --- | --- | --- | --- | --- | --- | --- |
| | Structure | Ratio | | | | | |
| CTP-55 | 77 | — | —CH₂CH₂— | 1 | ⁺(CH₂)₄ | 140 | 35 |
| CTP-56 | 77 | — | —CH₂CH₂— | 2 | ⁺(CH₂)₄ | 65 | 15 |
| CTP-57 | 82 | — | —CH₂CH₂— | 1 | ⁺(CH₂)₈ | 150 | 30 |
| CTP-58 | 82 | — | —CH₂CH₂— | 1 | cyclohexylene | 90 | 60 |
| CTP-59 | 6/19 | 1/1 | —CH₂CH₂— | 1 | phenylene | 110 | 70 |
| CTP-60 | 6/21 | 1/1 | —CH₂CH₂— | 1 | ⁺(CH₂)₂ | 110 | 40 |
| CTP-61 | 6/21 | 1/1 | —CH₂CH₂— | 1 | ⁺(CH₂)₄ | 85 | 85 |
| CTP-62 | 8/47 | 1/1 | —CH₂CH₂— | 2 | ⁺(CH₂)₄ | 45 | 80 |
| CTP-63 | 19/21 | 1/1 | —CH₂CH₂— | 1 | ⁺(CH₂)₈ | 80 | 40 |
| CTP-64 | 19/30 | 2/1 | —CH(CH₃)CH₂— | 1 | phenylene | 60 | 30 |
| CTP-65 | 19/31 | 1/1 | —CH₂CH₂— | 1 | ⁺(CH₂)₄ | 130 | 30 |
| CTP-66 | 19/38 | 2/1 | —CH₂CH₂— | 1 | ⁺(CH₂)₁₀ | 130 | 10 |
| CTP-67 | 46/47 | 1/1 | —CH₂CH₂— | 1 | ⁺(CH₂)₄ | 115 | 50 |

TABLE 14-continued

| Compound | Partial Structure (A) Structure | Ratio | Y | m | Z | q | r |
|---|---|---|---|---|---|---|---|
| CTP-68 | 47/48 | 1/1 | —CH$_2$CH$_2$— | 1 | +CH$_2$+ | 120 | 30 |
| CTP-69 | 48/61 | 1/1 | —CH(CH$_3$)CH$_2$— | 3 | +CH$_2$+ | 30 | 20 |
| CTP-70 | 61/72 | 1/1 | —CH$_2$CH$_2$— | 1 | +CH$_2$+ | 80 | 40 |
| CPT-71 | 61/73 | 1/1 | —CH$_2$CH$_2$CH$_2$— | 1 | +CH$_2$+ | 80 | 60 |
| CTP-72 | 77/82 | 1/1 | —CH$_2$CH$_2$— | 1 | +CH$_2$+ | 110 | 40 |

The monomer for use in the production of the charge transporting polymer of the present invention is easily synthesized by reacting an arylamine or diarylbenzidine with a halogenated carboalkoxyalkylbenzene.

With respect to the synthesis of a charge transporting material having an alkylenecarboxylic acid ester, JP-A-5-80550 discloses a method comprising introducing a chloromethyl group, forming a Grignard reagent with Mg, converting it into a carboxylic acid with carbon dioxide and then esterifying it. However, in this method, since the chloromethyl group is highly reactive, it cannot be introduced at the initial stage of the raw material. Accordingly, after forming a skeleton such as triarylamine or tetraarylbenzidine, it is required, for example, that the methyl group which has been introduced at the initial stage of the raw material is converted into a chloromethyl group, or that an unsubstituted raw material is used at the raw material stage and directly chloromethylated, or that a formyl group is introduced and reduced to a hydroxymethyl group and the hydroxymethyl group is converted into a chloromethyl group with thionyl chloride.

However, the charge transporting material having a skeletol such as triarylamine or tetraarylbenzidine is very highly reactive and readily undergoes substitution reaction to the aromatic ring, and accordingly, it is practically impossible to convert the methyl group introduced, into a chloromethyl group. In the method where an unsubstituted raw material is used at the raw material stage and directly chloromethylated, the chloromethyl group can be introduced only into the para-position with respect to the nitrogen atom. Further, in the method where a formyl group is introduced and lead to a chloromethyl group, the process comprises many steps. On the other hand, the method of reacting an arylamine or diarylbenzidine with a halogenated carboalkoxyalkylbenzne to obtain a monomer, is excellent in that the substituent site is easily changed to control the ionizing potential of the monomer and can achieve controlling of the ionizing potential of the charge transporting polymer. The charge transporting monomer for use in the present invention facilitates introduction of various substituents, is chemically stable and accordingly, easy to handle, and can overcome the above-described problems.

The charge transporting random copolyester resin of the present invention can be synthesized by using at least one charge transporting monomer represented by the following formula (VI-1) or (VI-2) and at least one dicarboxylic acid derivative represented by the following formula (VII) and polymerizing them according to the method described, for example, in Jikkenn Kagaku Koza, 4th ed., Vol. 28.

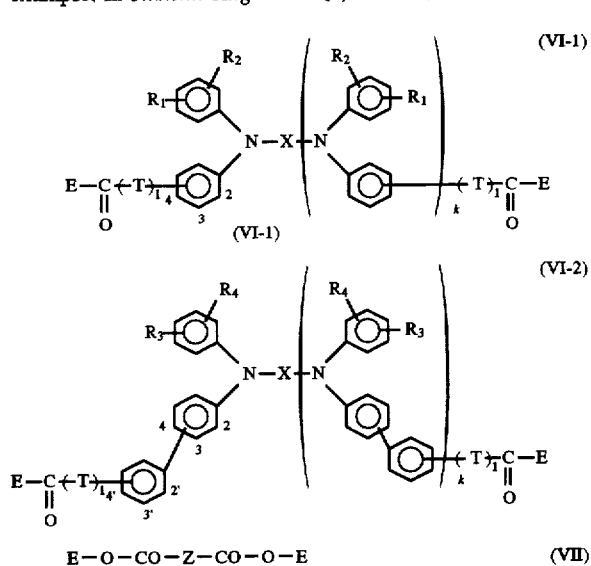

wherein R$_1$ to R$_4$ each independently a hydrogen atom, an alkyl group, an alkoxy group, a substituted amino group, a halogen atom or a substituted or unsubstituted aryl group; X represents a substituted or unsubstituted divalent aromatic group; T represents a linear or branched divalent hydrocarbon group having from 1 to 10 carbon atoms; k and l each represents 0 or 1; and E represents a hydroxyl group, a halogen atom or —O—R$_{15}$ (wherein R$_{15}$ represents an alkyl group, a substituted or unsubstituted aryl group or an aralkyl group).

More specifically, the charge transporting random copolyester resin of the present invention can be synthesized as follows:

(1) When E is a hydroxyl group:

When E is a hydroxyl group, a divalent alcohol represented by HO—(Y—O)$_m$—H is mixed with the compounds represented by formulae (VI-1), (VI-2) and (VII) (hereinafter referred to as (VI-1)+(VI-2)+(VII)) in an approximately equimolar amount, and the mixture is polymerized using an acid catalyst. The acid catalyst includes those used for usual esterification, such as sulfuric acid, toluenesulfonic acid and trifluoroacetic acid, and the acid catalyst is used in an amount of from 1/10,000 to 1/10 part by weight, preferably from 1/1,000 to 1/50 part by weight, per 1 part by weight of the charge transporting monomer. In order to remove water produced during polymerization, a solvent which is azeotropic with water is preferably used, such as toluene, chlorobenzene and 1-chloronaphthalene. The solvent is used in an amount of from 1 to 100 parts by weight, preferably from 2 to 50 parts by weight, per 1 part by weight of (VI-1)+(VI-2)+(VII). The reaction temperature may be suitably selected, but the reaction is preferably performed at the boiling point of the solvent in order to remove water produced during polymerization.

After completion of the reaction, in the case where a solvent is not used, the reaction product is dissolved in a solvent capable of dissolving the product. In the case where a solvent is used, the reaction solution is added dropwise as it is to a poor solvent which difficultly dissolves the polymer, for example, an alcohol such as methanol and ethanol, and acetone, to precipitate the charge transporting polymer. After separating the charge transporting polymer, the polymer is thoroughly washed with water or with an organic solvent and then dried. If necessary, a reprecipitation treatment, i.e., dissolving the polymer in an appropriate organic solvent and adding dropwise the solution to a poor solvent to precipitate a charge transporting polymer, may be repeated. The reprecipitation treatment is preferably performed while efficiently stirring the solution with a mechanical stirrer, etc. The solvent used for dissolving the charge transporting polymer in the reprecipitation treatment is used in an amount of from 1 to 100 parts by weight, preferably from 2 to 50 parts by weight, per 1 part by weight of (VI-1)+(VI-2)+(VII). The poor solvent is used in an amount of from 1 to 1,000 parts by weight, preferably from 10 to 500 parts by weight, per 1 part by weight of (VI-1)+(VI-2)+(VII).

(2) When E is a halogen atom:

When E is a halogen atom, a divalent alcohol represented by HO—(Y—O)$_m$—H is mixed with (VI-1)+(VI-2)+(VII) in an approximately equimolar amount and the mixture is polymerized using an organic basic catalyst such as pyridine or triethylamine. The organic basic catalyst is used in an amount of from 1 to 10 equivalents, preferably from 2 to 5 equivalents, per 1 equivalent of (VI-1)+(VI-2)+(VII). Useful examples of the solvent include methylene chloride, tetrahydrofuran (THF), toluene, chlorobenzene and 1-chloronaphthalene. The solvent is used in an amount of from 1 to 100 parts by weight, preferably from 2 to 50 parts by weight, per 1 part by weight of (VI-1)+(VI-2)+(VII). The reaction temperature may be suitably selected. After the polymerization, the polymer is purified by reprecipitation as described above.

In the case of using a divalent alcohol having a high acidity such as bisphenol, interfacial polymerization may be used. Specifically, a divalent alcohol is added to water, a base in an amount of more than equivalent is added and dissolved, and a solution of (VI-1)+(VI-2)+(VII) in an equimolar amount to the dihydric alcohol is added while vigorously stirring to perform polymerization. In this case, water is used in an amount of from 1 to 1,000 parts by weight, preferably from 2 to 500 parts by weight, per 1 part by weight of the divalent alcohol. Useful examples of the solvent which effectively dissolves (VI-1)+(VI-2)+(VII) include methylene chloride, dichloroethane, trichloroethane, toluene, chlorobenzene and 1-chloronaphthalene. The reaction temperature may be suitably selected. In order to accelerate the reaction, it is effective to use a phase transfer catalyst such as an ammonium salt and a sulfonium salt. The phase transfer catalyst is used in an amount of from 0.1 to 10 parts by weight, preferably from 0.2 to 5 parts by weight, per 1 part by weight of (VI-1)+(VI-2)+(VII).

(3) When E is —O—$R_{15}$:

When E is —O—$R_{15}$, a dihydric alcohol represented by HO—(Y—O)$_m$—H is added in excess and heated in the presence of a catalyst, for example, an inorganic acid such as sulfuric acid or phosphoric acid, titanium alkoxide, an acetate or carbonate of calcium or cobalt, or an oxide of zinc or lead, to synthesize the polyester resin by transesterification. The dihydric alcohol is used in an amount of from 2 to 100 equivalents, preferably from 3 to 50 equivalents, to (VI-1)+(VI-2)+(VII). The catalyst is used in an amount of from 1/10,000 to 1 part by weight, preferably from 1/1,000 to 1/2 part by weight, per 1 part by weight of (VI-1)+(VI-2)+(VII). The reaction is performed at a reaction temperature of from 200° to 300° C. After completion of the transesterification from the group —O—$R_{15}$ to the group —O—(Y—O)$_m$—H, reaction is preferably performed under a reduced pressure of from 0.01 to 100 mmHg, preferably from 0.05 to 20 mmHg, so as to accelerate polymerization by the release of HO—(Y—O)$_m$—H. The reaction may also be performed using a high boiling point solvent which is azeotropic with HO—(Y—O)$_m$—H, such as 1-chloronaphthalene, under a normal pressure while azeotropically removing HO—(Y—O)$_m$—H.

Among the above-described synthesis methods of a charge transporting polyester resin, synthesis method (3) is most preferred because high molecular weight polymers can be easily obtained. If the monomer ratio [(VI-1)+(VI-2)]/[(VI-1)+(VI-2)+(VII)] is too small, the mobility is reduced so that the polymer cannot be used alone in practice and a low molecular weight compound or other polymeric charge transporting material must be added. Accordingly, 0.3≦[(VI-1)+(VI-2)]/[(VI-1)+(VI-2)+(VII)]<1, preferably 0.4≦[(VI-1)+(VI-2)]/[(VI-1)+(VI-2)+(VII)]<1, more preferably 0.5≦[(VI-1)+(VI-2)]/[(VI-1)+(VI-2)+(VII)]<1.

The polymerization degree p of the charge transporting polymer is from 5 to 5,000, preferably from 10 to 3,000, more preferably from 15 to 1,000. If the p is too low, the film-forming property of the polymer is deteriorated so that a strong film cannot be obtained, whereas if it is too high, solubility of the polymer in a solvent is lowered so that the processability of the polymer is deteriorated.

The novel charge transporting random copolyester resin of the present invention is used for organic electronic devices.

The organic electronic device of the present invention may contain a substantially insulating polymer compatible with the charge transporting polymer of the present invention together with the charge transporting polymer. The term "substantially insulating polymer" herein means that the polymer has a volume resistivity of $10^{12}$ Ω.cm or greater. The novel charge transporting polymer of the present invention can be applied to an electrophotographic photoreceptor or an organic electroluminescence element.

More specifically, an organic electronic device using the charge transporting polymer of the present invention comprises a support having thereon a layer containing the above-described charge transporting polymer. A representative example of the organic electronic device is an electrophotographic photoreceptor comprising a conductive support having thereon a photosensitive layer. In the electrophotographic photoreceptor using the charge transporting polymer of the present invention, the photosensitive layer may have a single-layer structure or a functionally separated multi-layer structure which comprises a charge generating layer and a charge transporting layer. In the case of the multi-layer structure, either the charge generating layer or the charge transporting layer may be the upper layer. The electrophotographic photoreceptor using the charge transporting polyester resin preferably comprises a photosensitive layer comprising a plurality of layers, the outermost layer of the photosensitive layer containing a charge transporting polymer having at least one structure represented by formula (I-1) or (I-2) and at least one dicarboxylic acid component represented by formula (II). A preferred example thereof is an electrophotographic photoreceptor of which the photosensitive layer contains as a charge transporting material a charge transporting polymer having at least one structure represented by formula (I-1) or (I-2) and at least one dicarboxylic acid component represented by formula (II), and as a charge generating material a phthalocyanine compound crystal.

Examples of the phthalocyanine crystal for use in combination with the charge transporting polymer in the above-described electrophotographic photoreceptor of the present invention include halogenogallium phthalocyanine crystals disclosed in JP-A-5-98181, halogenotin phthalocyanine crystals disclosed in JP-A-5-140472 and JP-A-5-140473, hydroxygallium phthalocyanine crystals disclosed in JP-A-5-263007 and JP-A-5-279591, and oxotitanium phthalocyanine crystals described in JP-A-4-189873 and JP-A-5-43813. By using the phthalocyanine crystal, an electrophotographic photoreceptor having high sensitivity and excellent stability to repeated use can be obtained.

The chlorogallium phthalocyanine crystal for use in the present invention can be produced, as disclosed in JP-A-5-98181, by mechanically dry-grinding chlorogallium phthalocyanine crystals produced by a known method in an automatic mortar, a planetary mill, a vibration mill, a CF mill, a roller mill, a sand mill or a kneader, or by subjecting the crystals, after dry grinding, to wet grinding process together with a solvent by means of a ball mill, a mortar, a sand mill or a kneader. Examples of the solvent for use in the above-described process include aromatics (e.g., toluene, chlorobenzene), amides (e.g., dimethylformamide, N-methylpyrrolidone), aliphatic alcohols (e.g., methanol, ethanol, butanol), aliphatic polyhydric alcohols (e.g., ethylene glycol, glycerin, polyethylene glycol), aromatic alcohols (e.g., benzyl alcohol, phenethyl alcohol), esters (e.g., acetate, butyl acetate), ketones (e.g., acetone, methyl ethyl ketone), dimethylsulfoxide, ethers (e.g., diethyl ether, tetrahydrofuran), a mixture of several kinds of these solvents, and a mixture of water with these organic solvents. The solvent is used in an amount of from 1 to 200 parts by weight, preferably from 10 to 100 parts by weight, to the chlorogallium phthalocyanine. The processing temperature is from 0° C. to the boiling point of the solvent, preferably from 10° to 60° C. In the grinding, a grinding aid such as sodium chloride or Glauber's salt may be used. The grinding aid is used in an amount of from 0.5 to 20 times, preferably from 1 to 10 times, the weight of the chlorogallium phthalocyanine.

The dichlorotin phthalocyanine crystal can be produced, as disclosed in JP-A-5-140472 and JP-A-5-140473, by grinding dichlorotin phthalocyanine crystals produced by a known method, and treating the crystals with a solvent, in the same manner as the above-described chlorogallium phthalocyanine.

The hydroxygallium phthalocyanine crystal can be produced, as disclosed in JP-A-5-263007 and JP-A-5-279591, by subjecting chlorogallium phthalocyanine crystals produced by a known method to hydrolysis in an acidic or alkaline solution or to acid pasting to thereby synthesize hydroxygallium phthalocyanine crystals, and then subjecting the hydroxygallium phthalocyanine crystals obtained to direct treatment with a solvent, or to wet grinding process together with a solvent by means of a ball mill, a mortar, a sand mill or a kneader, or to dry grinding process using no solvent and then treatment with a solvent. Examples of the solvent for use in the above-described process and treatment include aromatics (e.g., toluene, chlorobenzene), amides (e.g., dimethylformamide, N-methylpyrrolidone), aliphatic alcohols (e.g., methanol, ethanol, butanol), aliphatic polyhydric alcohols (e.g., ethylene glycol, glycerin, polyethylene glycol), aromatic alcohols (e.g., benzyl alcohol, phenethyl alcohol), esters (e.g., acetate, butyl acetate), ketones (e.g., acetone, methyl ethyl ketone), dimethylsulfoxide, ethers (e.g., diethyl ether, tetrahydrofuran), a mixture of several kinds of these solvents, and a mixture of water with these solvents. The solvent is used in an amount of from 1 to 200 parts by weight, preferably from 10 to 100 parts by weight, to the hydroxygallium phthalocyanine. The processing temperature is from 0° to 150° C., preferably from room temperature to 100° C. In the grinding, a grinding aid such as sodium chloride or Glauber's salt may be used. The grinding aid is used in an amount of from 0.5 to 20 times, preferably from 1 to 10 times, the weight of the hydroxygallium phthalocyanine.

The oxotitanium phthalocyanine crystal is produced, as disclosed in JP-A-4-189873 and JP-A-5-43813, by acid pasting oxotitanium phthalocyanine crystals produced by a known method or by salt milling oxotitanium phthalocyanine crystals produced by a known method together with an inorganic salt by means of a ball mill, a mortar, a sand mill or a kneader to form oxotitanium phthalocyanine crystals showing a peak at 27.2° in the X-ray diffractometry and having a relatively low crystallinity, and then subjecting the crystals directly to the treatment with a solvent, or to wet grinding process together with a solvent by means of a ball mill, a mortar, a sand mill or a kneader. The acid for use in the acid pasting is preferably sulfuric acid having a concentration of from 70 to 100%, more preferably from 95 to 100%. The dissolving temperature is from −20° to 100° C., preferably from 0° to 60° C. The amount of the concentrated sulfuric acid is from 1 to 100 times, preferably from 3 to 50 times, the weight of the oxotitanium phthalocyanine crystals. The solvent used for precipitation is water or a mixed solvent of water with an organic solvent, and is used in a suitable amount. A mixed solvent of water with an alcoholic solvent such as methanol or ethanol and a mixed solvent of water with an aromatic solvent such as benzene or toluene are particularly preferred. The precipitating temperature is not particularly limited. In order to prevent heat generation, the reaction system is preferably cooled with ice, etc. The ratio of the oxotitanium phthalocyanine crystal to the inorganic acid is from $\frac{1}{0.1}$ to $\frac{1}{20}$ by weight, preferably from $\frac{1}{0.5}$ to $\frac{1}{5}$ by weight. Examples of the solvent for use in the above-described treatment with a solvent include aromatics (e.g., toluene, chlorobenzene), aliphatic alcohols (e.g., methanol, ethanol, butanol), halogenated hydrocarbons (e.g., dichloromethane, chloroform, trichloroethane), a mixture of several kinds of these solvents, and a mixed solvent of water with these solvents. The solvent is used in an amount of from 1 to 100 times, preferably from 5 to 50 times, the weight of the oxotitanium phthalocyanine. The processing temperature is from room temperature to 100° C., preferably from 50° to 100° C. The grinding aid is used in an amount of from 0.5 to 20 times, preferably from 1 to 10 times, the weight of oxotitanium phthalocyanine crystal.

The electrophotographic photoreceptor is described below.

Examples of the conductive support include metals such as aluminum, nickel, chromium and stainless steel, plastic films having provided thereon a thin film of aluminum, titanium, nickel, chromium, stainless steel, gold, vanadium, tin oxide, indium oxide or ITO, and paper or plastic films coated or impregnated with a conductivity-imparting agent. The conductive support is formed into an appropriate shape upon use, such as a drum, a sheet or a plate; however, the present invention is not limited thereto. If necessary, the conducive support may be subjected to various surface treatments as long as the image quality is not adversely affected. For example, the surface is subjected to oxidation treatment, chemical treatment, coloring treatment or irregular reflection treatment such as sand grinding. A undercoat layer may be provided between the conductive support and a charge generating layer. The undercoat layer not only inhibits injection of charges from the conductive support into the photosensitive layer during charging of the photosensitive layer having a laminate structure but also serves as an adhesive layer for integrating the photosensitive layer with the conductive layer, and in some cases, the undercoat layer prevents light reflection on the conductive support.

Examples of the binder resin for use in the undercoat layer include known materials such as a polyethylene resin, a polypropylene resin, an acrylic resin, a methacrylic resin, a polyamide resin, a vinyl chloride resin, a vinyl acetate resin, a phenolic resin, a polycarbonate resin, a polyurethane resin, a polyimide resin, a vinylidene chloride resin, a polyvinyl acetal resin, a vinyl chloride-vinyl acetate copolymer, a polyvinyl alcohol resin, a water-soluble polyester resin, nitrocellulose, casein, gelatin, a polyglutamic acid, starch, starch acetate, aminostarch, a polyacrylic acid, polyacrylamide, a zirconium chelate compound, a titanium chelate compound, a titanium alkoxide compound, an organic titanium compound, and a silane coupling agent. The undercoat layer has a thickness of from 0.01 to 10 µm, preferably from 0.05 to 2 µm. The undercoat layer can be provided by a usual coating method. Examples thereof include blade coating, Mayer bar coating, spray coating, dip coating, bead coating, air knife coating and curtain coating.

The charge transporting layer may contain the charge transporting polymer of the present invention either alone or in combination with a known binder resin or with other hydrazone charge transporting material, triarylamine charge transporting material or stilbene charge transporting material. Examples of the binder resin include known resins such as a polycarbonate resin, a polyester resin, a methacrylic resin, a acrylic resin, a polyvinyl chloride resin, polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone-alkyd resin, a phenol-formaldehyde resin, a styrene-alkyd resin, poly-N-vinylcarbazole and polysilane. The present invention is, however, by no means limited thereto. Among the above-described binder resins, polycarbonate resins represented by the following formulae (VIII) to (XIII) and polycarbonate resins resulting from copolymerization thereof have a good compatibility with the charge transporting polymer so that a uniform film exhibiting excellent characteristics is obtained. The blending ratio (by weight) of the charge transporting polymer to the binder resin is preferably from 10:0 to 8:10. When other charge transporting material is used in combination, the blending ratio (by weight) of (the charge transporting polymer+the binder resin) to (the charge transporting material) is preferably from 10:0 to 10:8.

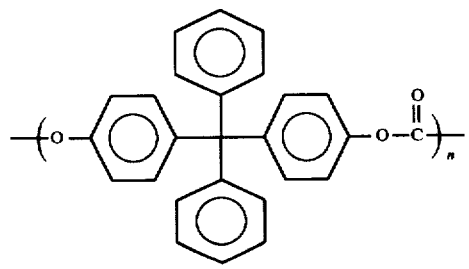

(VIII)

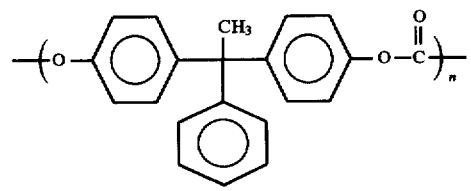

(IX)

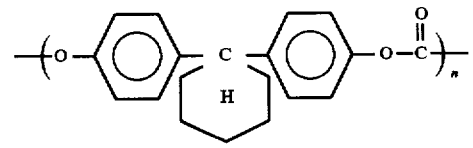

(X)

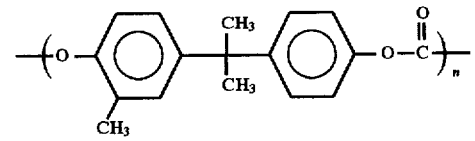

(XI)

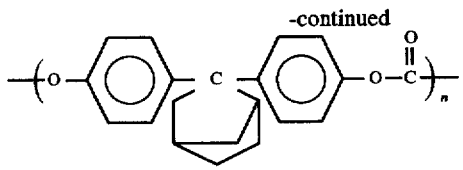

(XII)

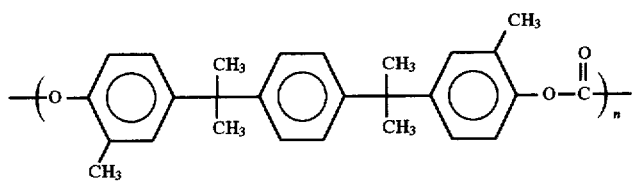

(XIII)

(wherein n represents a polymerization degree of from 50 to 3,000).

The charge generating material for use in the charge generating layer is preferably a phthalocyanine crystal which is described above. However, any known charge generating material such as bisazo pigments, phthalocyanine pigments, squarylium pigments, perylene pigments or dibromoanthanthrone may be used.

The binder resin for use in the charge generating layer may be selected from a broad range of insulating resins. The binder resin may also be selected from organic photoconductive polymers such as poly-N-vinylcarbazole, polyvinylanthracene, polyvinylpyrene and polysilane. Preferred examples of the binder resin include insulating resins such as a polyvinyl butyral resin, a polyarylate resin (e.g., polycondensate of bisphenol A with phthalic acid), a polycarbonate resin, a polyester resin, a phenoxy resin, a vinyl chloride-vinyl acetate copolymer, a polyamide resin, an acrylic resin, a polyacrylamide resin, a polyvinyl pyridine resin, a cellulose resin, a urethane resin, an epoxy resin, casein, a polyvinyl alcohol resin and a polyvinyl pyrrolidone resin. However, the present invention is not limited thereto. The above-described binder resins may be used singly or in combination of two or more thereof.

The blending ratio (by weight) of the charge generating material to the binder resin is preferably from 10:1 to 1:10. Dispersion thereof may be performed by a usual method such as ball mill dispersion, attritor dispersion or sand mill dispersion.

In this dispersion process, it is effective to provide the particles each having a particle size of 0.5 μm or less, preferably 0.3 μm or less, more preferably 0.15 μm or less. Examples of the solvent for use in the dispersion process include usual organic solvents such as methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene and toluene. These organic solvents may be used either singly or in combination of two or more thereof.

The present invention is described in greater detail below with reference to Examples, however, the present invention should not be construed as being limited thereto. Unless otherwise indicated, the "parts" in Examples mean the "parts by weight".

PREPARATION EXAMPLE 1

Synthesis of N,N-bis[3-(2-ethoxycarbonylethyl)phenyl]-3,4-xylidine (structure of Moiety A is Partial Structure 3 with the terminals being diethyl ester)

In a 100 ml-volume flask, 6 g of 3,4-xylidine, 34 g of ethyl 3-iododihydrocinnamate, 19 g of potassium carbonate, 5 g of copper sulfate pentahydrate and 20 ml of n-tridecane were placed, and the mixture was reacted under heating at 230° C. for 10 hours in a nitrogen stream. After the reaction, the system was cooled to room temperature, the reaction mixture was dissolved in 50 ml of toluene, insoluble matters were filtered, and the filtrate was purified by silica gel column chromatography using toluene to obtain 20 g of N, N-bis[3-(2-ethoxycarbonylethyl)phenyl]-3,4-xylidine as an oily substance. The IR spectrum of the product is shown in FIG. 1.

PREPARATION EXAMPLE 2

Synthesis of N,N'-diphenyl-N,N'-bis[3-(2-ethoxycarbonylethyl)phenyl]-[1,1'-biphenyl]-4,4'-diamine (structure of Moiety A is Partial Structure 6 with the terminals being diethyl ester)

Figure 2:
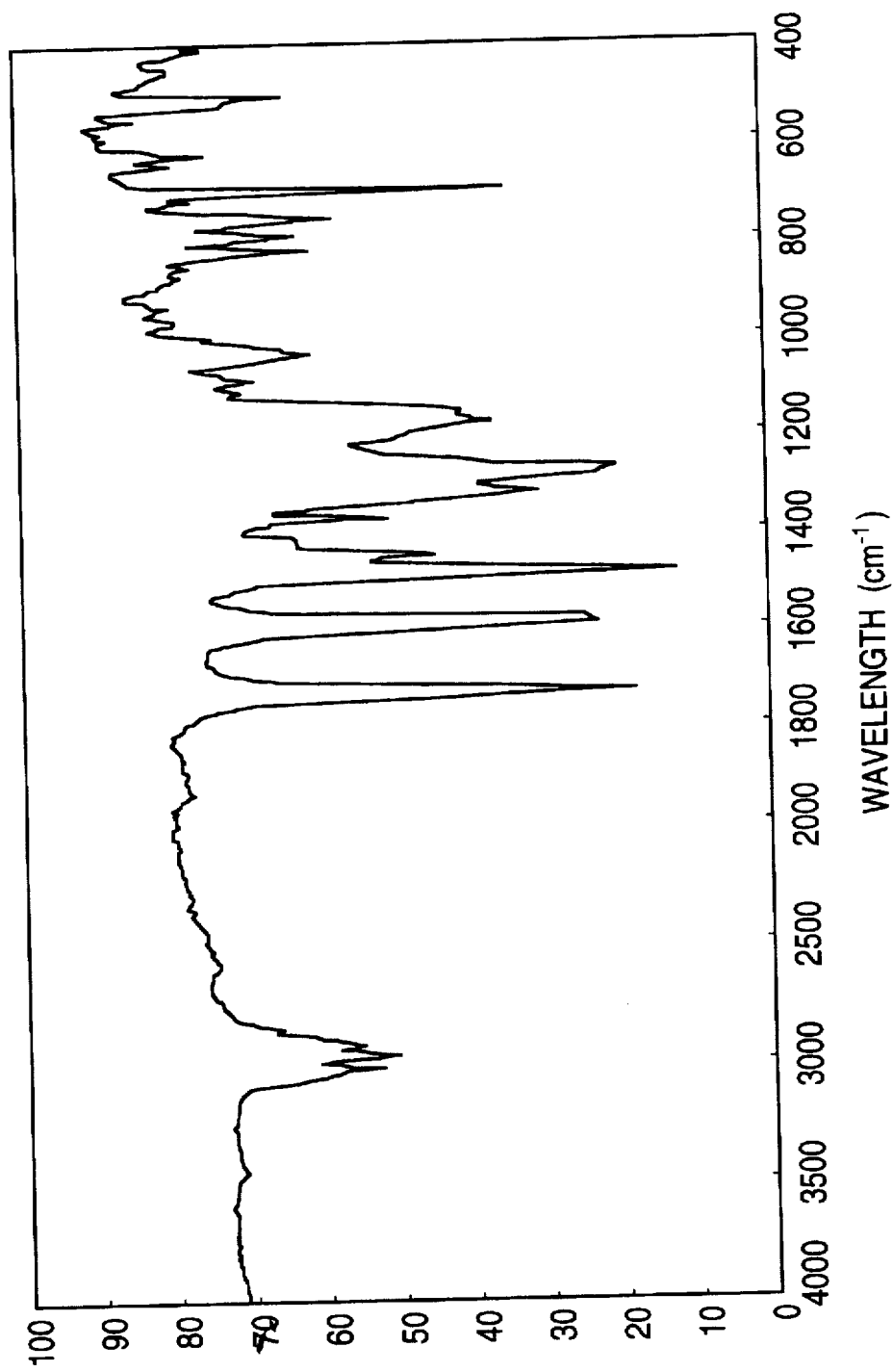
FIG. 2 is an IR spectrum of the monomer prepared in Preparation Example 2.

In a 100 ml-volume flask, 10.77 g of N,N'-diphenylbenzidine, 23.0 g of ethyl 3-iododihydrocinnamate, 11.61 g of potassium carbonate, 1.0 g of copper sulfate pentahydrate and 20 ml of n-tridecane were placed, and the mixture was reacted under heating at 230° C. for one hour in a nitrogen stream. After the reaction, the system was cooled to room temperature, the reaction mixture was dissolved in 50 ml of toluene, insoluble matters were filtered and the filtrate was purified by silica gel column chromatography using toluene to obtain 19.6 g of N,N'-diphenyl-N,N'-bis[3-( 2-ethoxycarbonylethyl)phenyl]-[1,1'-biphenyl]-4,4'-diamine as an oily substance. The IR spectrum of the product is shown in FIG. 2.

PREPARATION EXAMPLE 3

Synthesis of 3,3'-dimethyl-N,N'-bis(3,4-dimethylphenyl)-N, N'-bis[4-(2-methoxycarbonylethyl)phenyl]-[1,1'-biphenyl]-4,4'-diamine (structure of Moiety A is Partial Structure 19 with the terminals being dimethyl ester)

Figure 3:
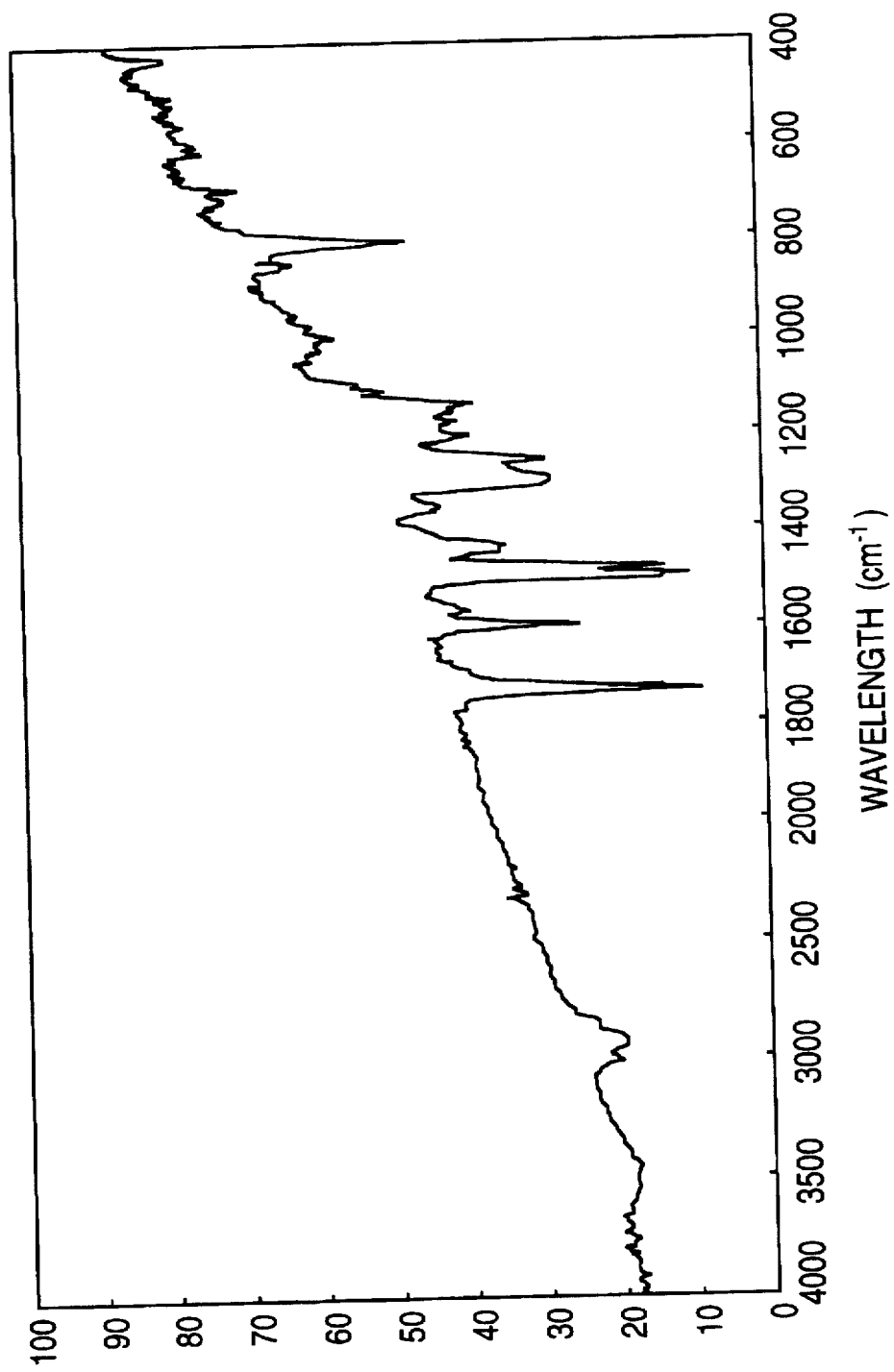
FIG. 3 is an IR spectrum of the monomer prepared in Preparation Example 3.

In a 1,000 ml-volume flask, 45 g of N-(3,4-dimethylphenyl)-N-[4-(2-methoxycarbonylethyl)phenyl]amine, 30 g of 4,4'-diiodo-3,3'-dimethylbiphenyl, 27 g of potassium carbonate, 5 g of copper sulfate pentahydrate and 20 ml of n-tridecane were placed, and the mixture was reacted under heating at 230° C. for 5 hours in a nitrogen stream. After the reaction, the system was cooled to room temperature, the reaction mixture was dissolved in 200 ml of toluene, insoluble matters were filtered, the filtrate was purified by silica gel column chromatography using toluene, and the product was recrystallized from a mixed solvent of ethyl acetate and ethanol to obtain 38 g of 3,3'-dimethyl-N, N'-bis(3,4-dimethylphenyl)-N,N'-bis[4-(2-methoxycarbonylethyl)phenyl]-[1,1'-biphenyl]-4,4'-diamine as a pale yellow powder (melting point, 162.5° to 164° C.). The IR spectrum of the product is shown in FIG. 3.

PREPARATION EXAMPLE 4

Synthesis of 3,3'-dimethyl-N,N'-bis(4-methoxyphenyl)-N, N'-bis[4-(2-methoxycarbonylethyl)phenyl]-[1,1'-biphenyl]- 4,4,-diamine (structure of Moiety A is Partial Structure 22 with the terminals being dimethyl ester)

Figure 4:
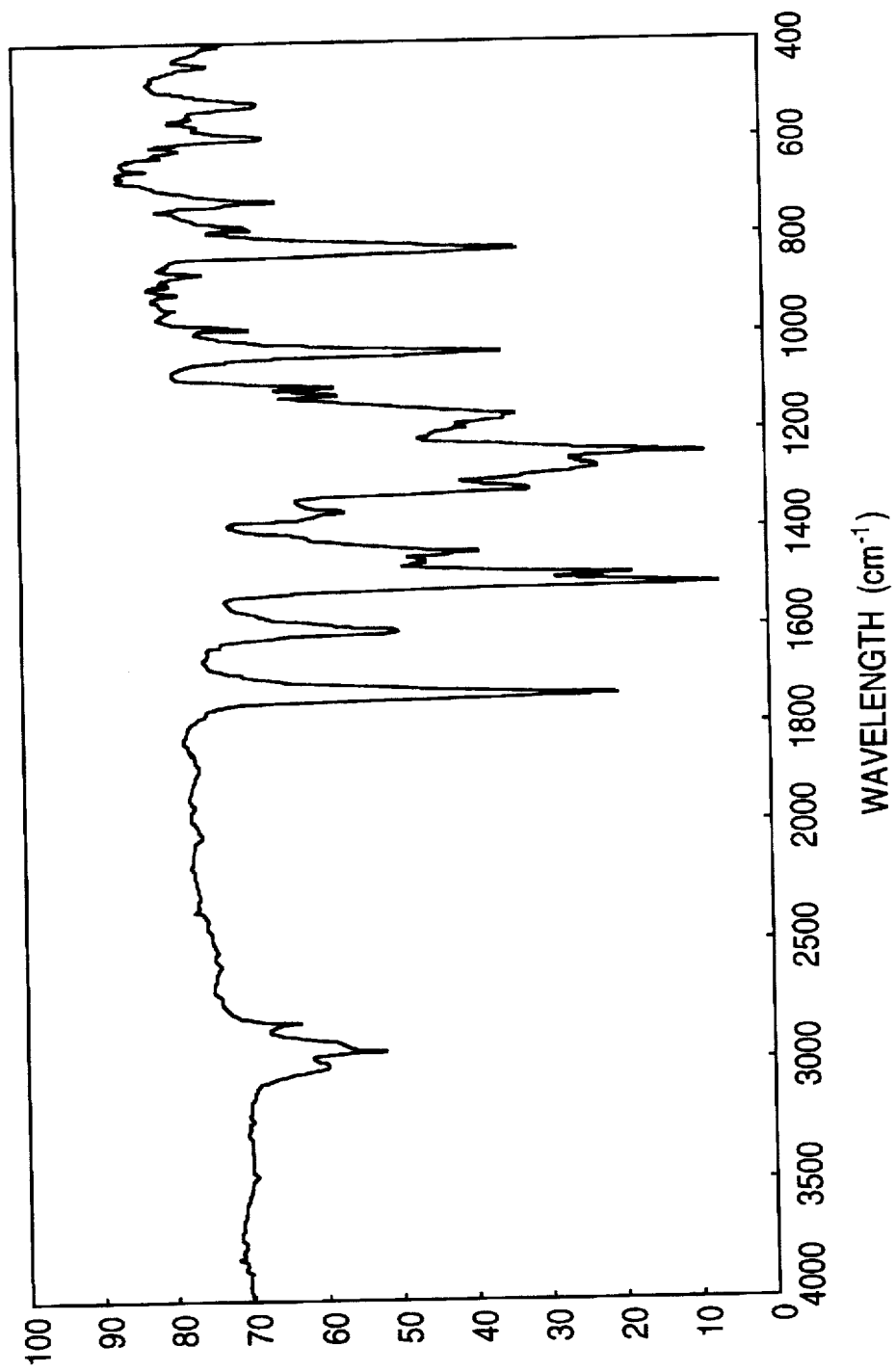
FIG. 4 is an IR spectrum of the monomer prepared in Preparation Example 4.

In a 100 ml-volume flask, 5.0 g of N-(4-methoxyphenyl)-N-[4-(2-methoxycarbonylethyl)phenyl]amine, 3.4 g of 4,4'-diiodo-3,3'-dimethylbiphenyl, 2.9 g of potassium carbonate, 0.5 g of copper sulfate pentahydrate and 5 ml of n-tridecane were placed, and the mixture was reacted under heating at 230° C. for 15 hours in a nitrogen stream. After the reaction, the system was cooled to room temperature, the reaction mixture was dissolved in 20 ml of toluene, insoluble matters were filtered and the filtrate was purified by silica gel column chromatography using toluene to obtain 5.3 g of 3,3'-dimethyl-N,N'-bis(4-methoxyphenyl)-N,N'-bis[4-(2-methoxycarbonylethyl)phenyl]-[1,1'-biphenyl]-4,4'-diamine as a pale yellow oily substance. The IR spectrum of the product is shown in FIG. 4.

PREPARATION EXAMPLE 5

Synthesis of N,N'-bis(3,4-dimethylphenyl)-N,N'-bis [4-(2-methoxycarbonylethyl)phenyl]-[1,1':4',1"-terphenyl]-4,4'-diamine (structure of Moiety A is Partial Structure 31 with the terminals being dimethyl ester)

Figure 5:
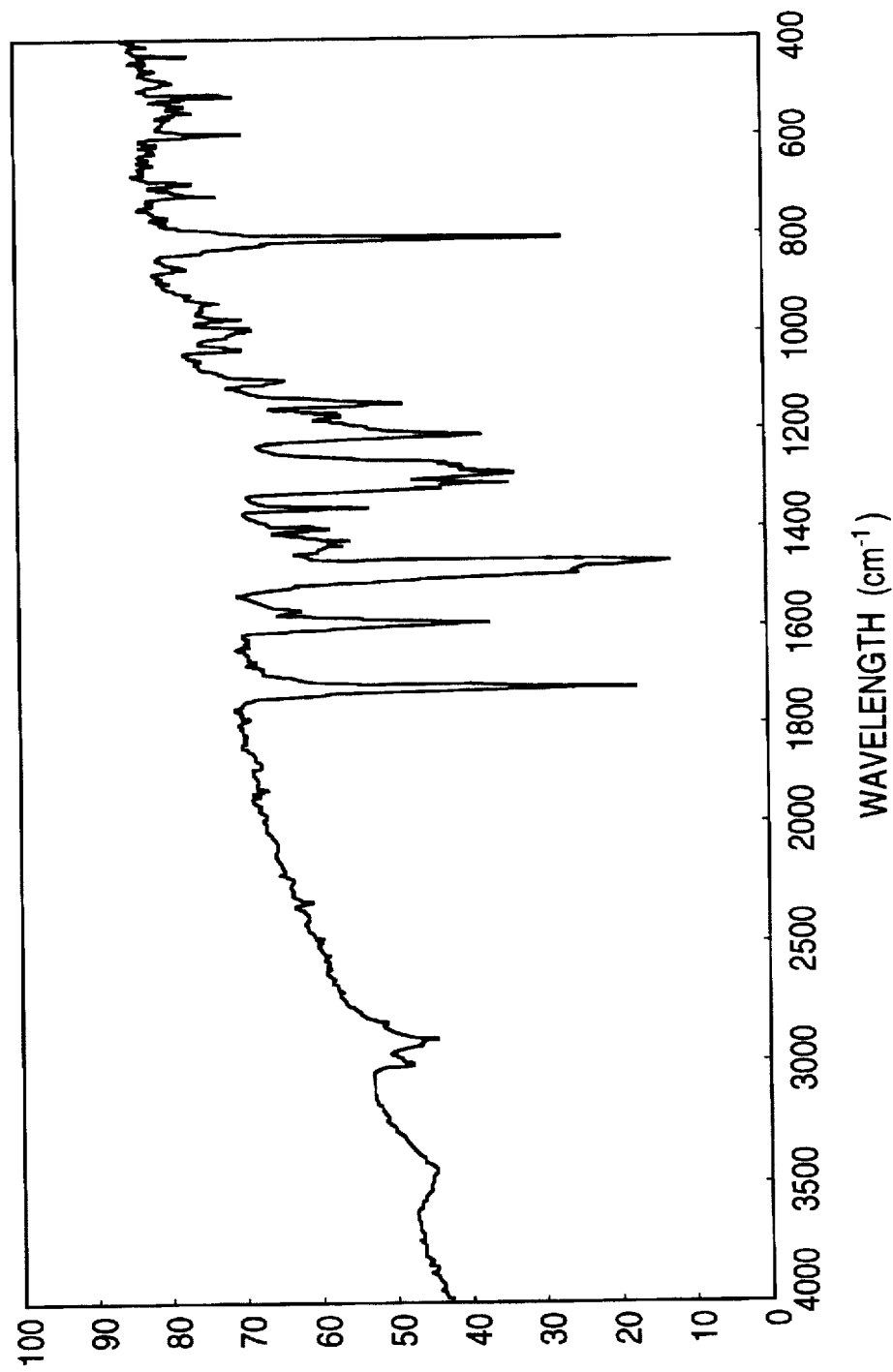
FIG. 5 is an IR spectrum of the monomer prepared in Preparation Example 5.

In a 200 ml-volume flask, 5.0 g of N-(3,4-dimethylphenyl)-N-[4-(2-methoxycarbonylethyl)phenyl] amine, 3.8 g of 4,4"-diiodo-1,1':4',1"-terphenyl, 2.9 g of potassium carbonate, 1.0 g of copper sulfate pentahydrate and 10 ml of n-tridecane were placed, and the mixture was reacted under heating at 230° C. for 5 hours in a nitrogen stream. After the reaction, the system was cooled to room temperature, the reaction mixture was dissolved in 20 ml of toluene, insoluble matters were filtered, the filtrate was purified by silica gel column chromatography using toluene, and the product was recrystallized from acetone to obtain 3.7 g of N,N'-bis(3,4-dimethylphenyl)-N,N'-bis[4-(2-methoxycarbonylethyl)phenyl]-[1,1':4',1"-terphenyl]-4,4"-diamine as a pale yellow powder (melting point: 146° to 147° C.). The IR spectrum of the product is shown in FIG. 5

PREPARATION EXAMPLE 6

Synthesis of 3,3'-dimethyl-N,N'-bis(3,4-dimethylphenyl)-N, N'-bis[4-(2-methoxycarbonylmethyl)phenyl]-[1,1'-biphenyl]-4, 4'-diamine (structure of Moiety A is Partial Structure 18 with the terminals being dimethyl ester)

Figure 6:
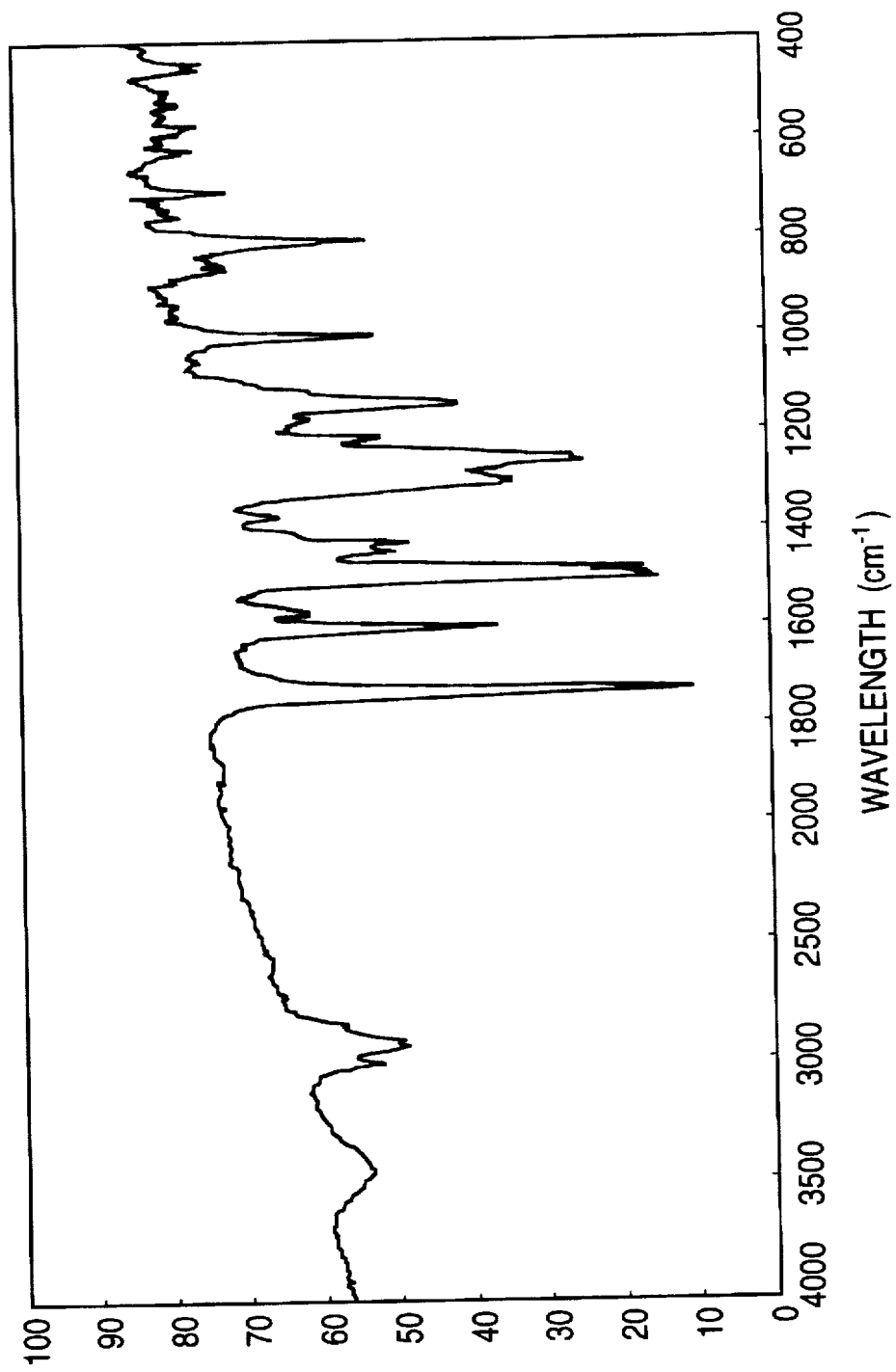
FIG. 6 is an IR spectrum of the monomer prepared in Preparation Example 6.

In a 200 ml-volume flask, 9.0 g of N-(3,4-dimethylphenyl)-N-[4-(2-methoxycarbonylmethyl)phenyl] amine, 6.2 g of 4,4'-diiodo-3,3'-dimethylbiphenyl, 5.5 g of potassium carbonate, 1.0 g of copper sulfate pentahydrate and 10 ml of n-tridecane were placed, and the mixture was reacted under heating at 230° C. for 5 hours in a nitrogen stream. After the reaction, the system was cooled to room temperature, the reaction mixture was dissolved in 40 ml of toluene, insoluble matters were filtered, the filtrate was purified by silica gel column chromatography using toluene, and the product was recrystallized from a mixed solvent of ethyl acetate and ethanol to obtain 7.1 g of 3,3'-dimethyl-N,N'-bis(3,4-dimethylphenyl)-N,N'-bis[4-(2-methoxycarbonylmethyl)phenyl]-[1,1'-biphenyl]-4,4'-diamine as a pale yellow powder (melting point: 179° to 181° C.). The IR spectrum of the product is shown in FIG. 6.

PREPARATION EXAMPLE 7

Synthesis of N,N'-diphenyl-N,N'-bis[4-(4-ethoxycarbonylethylphenyl)phenyl]-[1,1'-biphenyl]-4,4'-diamine (structure of Moiety A is Partial Structure 48 with the terminals being diethyl ester)

Figure 7:
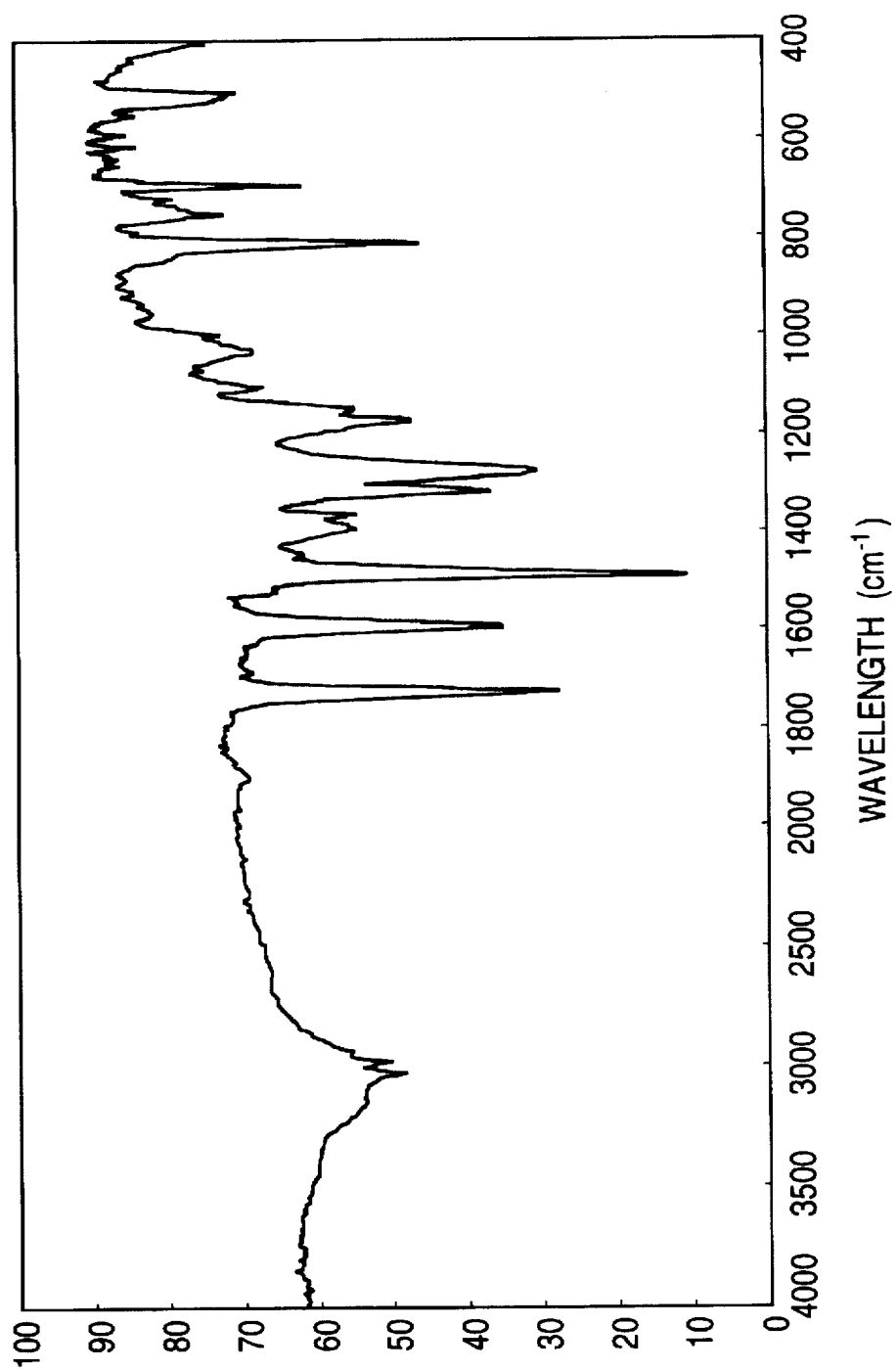
FIG. 7 is an IR spectrum of the monomer prepared in Preparation Example 7.

In a 200 ml-volume flask, 10.0 g of N, N'-diphenylbenzidine, 24.0 g of 4-ethoxycarbonylethyl-4'-iodobiphenyl, 11 g of potassium carbonate, 1.0 g of copper sulfate pentahydrate and 30 ml of n-tridecane were placed, and the mixture was reacted under heating at 230° C. for one hour in a nitrogen stream. After the reaction, the system was cooled to room temperature, the reaction mixture was dissolved in 10 ml of toluene, insoluble matters were filtered and the filtrate was purified by silica gel column chromatography using toluene to obtain 16.6 g of N,N'-diphenyl-N,N'-bis[4-(4-ethoxycarbonylethylphenyl)phenyl]-[1,1'-biphenyl]-4,4'-diamine as an oily substance. The IR spectrum of the product is shown in FIG. 7.

PREPARATION EXAMPLE 8

To 230 parts of quinoline, 30 parts of 1,3-diiminoisoindoline and 9.1 parts of gallium trichloride were added, and the mixture was reacted at 200° C. for 3 hours. The reaction product was separated by filtration and washed successively with acetone and methanol, and the wet cake was dried to obtain 28 parts of chlorogallium phthalocyanine crystals. Three parts of chlorogallium phthalocyanine crystals obtained were dry ground in an automatic mortar (Lab-Mill Model UT-21, manufactured by Yamato Kagaku K. K.) for 3 hours, 0.5 part of ground crystals was milled together with 60 parts of glass beads (1 mm in diameter) in 20 parts of benzyl alcohol at room temperature for 24 hours, the glass beads were separated by filtration, and the filtrate was washed with 10 parts of methanol and dried to obtain chlorogallium phthalocyanine crystals having intense diffraction peaks at 2θ°±0.2° of 7.4°, 16.6°, 25.5° and 28.3° in the powder X-ray diffraction spectrum. This was designated as CG-1.

PREPARATION EXAMPLE 9

To 350 ml of 1-chloronaphthalene, 50 g of phthalonitrile and 27 g of anhydrous stannic chloride were added, and the mixture was reacted at 195° C. for 5 hours. The reaction product was separated by filtration, washed successively with 1-chloronaphthalene, acetone, methanol and water, and dried under reduced pressure to obtain 18.3 g of dichlorotin phthalocyanine crystals. The thus-obtained dichlorotin phthalocyanine crystals (5 g) were placed in an agate-made pot together with 10 g of sodium chloride and 500 g of agate balls (20 mm in diameter), ground by means of a planetary ball mill (Model P-5, manufactured by Fritch Co., Ltd.) at 400 rpm for 10 hours, thoroughly washed with water, and then dried. Then, the crystals (0.5 g) was milled together with 15 g of THF and 30 g of glass beads (1 mm in diameter) at room temperature for 24 hours, the glass beads were separated by filtration, and the filtrate was washed with methanol and dried to obtain dichlorotin phthalocyanine crystals having intense diffraction peaks at 2θ±0.2° of 8.5°, 11.2°, 14.5° and 27.2° in the powder X-ray diffraction spectrum. This was designated as CG-2.

PREPARATION EXAMPLE 10

To 60 parts of concentrated sulfuric acid, 3 parts of chlorogallium phthalocyanine crystals obtained in Preparation Example 8 were dissolved at 0° C., and the solution was added dropwise to 450 parts of distilled water at 5° C. to reprecipitate crystals. The crystals were washed with distilled water or diluted aqueous ammonia, and then dried to obtain 2.5 parts of hyroxygallium phthalocyanine crystals. The crystals were ground in an automatic mortar for 5.5 hours. 0.5 part of the ground crystals was milled together with 15 parts of dimethylformamide and 30 parts of glass beads each having a diameter of 1 mm for 24 hours, and the crystals were separated, washed with methanol and then dried to obtain hydroxygallium phthalocyanine crystals having intense diffraction peaks at 2θ°±0.2° of 7.5°, 9.9°, 12.5°, 16.3°, 18.6°, 25.1° and 28.3° in the powder X-ray diffraction spectrum. This was designated as CG-3.

PREPARATION EXAMPLE 11

To 200 parts of 1-chloronaphthalene, 30 parts of 1,3-diiminoisoindoline and 17 parts of titanium tetrabutoxide were added, and the mixture was reacted at 190° C. for 5 hours in a nitrogen stream. The reaction product was separated by filtration and washed successively with aqueous ammonia, water and acetone to obtain 40 parts of oxotitanium phthalocyanine. Five parts of the thus-obtained oxotitanium phthalocyanine crystals and 10 parts of sodium chloride were ground in an automatic mortar (Lab-Mill Model UT-21, manufactured by Yamato Kagaku K. K.) for 3 hours. Thereafter, the mixture was thoroughly washed with distilled water and then dried to obtain 4.8 g of oxotitanium phthalocyanine crystals. The resulting oxotitanium phthalocyanine crystal exhibited a distinct peak at 2θ°±0.2° of 27.3° in the powder X-ray diffraction spectrum. Two parts of the thus-obtained oxotitanium phthalocyanine crystals were stirred in a mixed solvent of 20 parts of distilled water and 2 parts of monochlorobenzene at 50° C. for one hour, then filtered, thoroughly washed with methanol and dried to obtain oxotitanium phthalocyanine hydrate crystals having an intense diffraction peak at 2θ°±0.2° of 27.3° in the powder X-ray diffraction spectrum. This was designated as CG-4.

EXAMPLE 1

Synthesis of Charge Transporting Polyester Resin (CTP-16)

Figure 8:
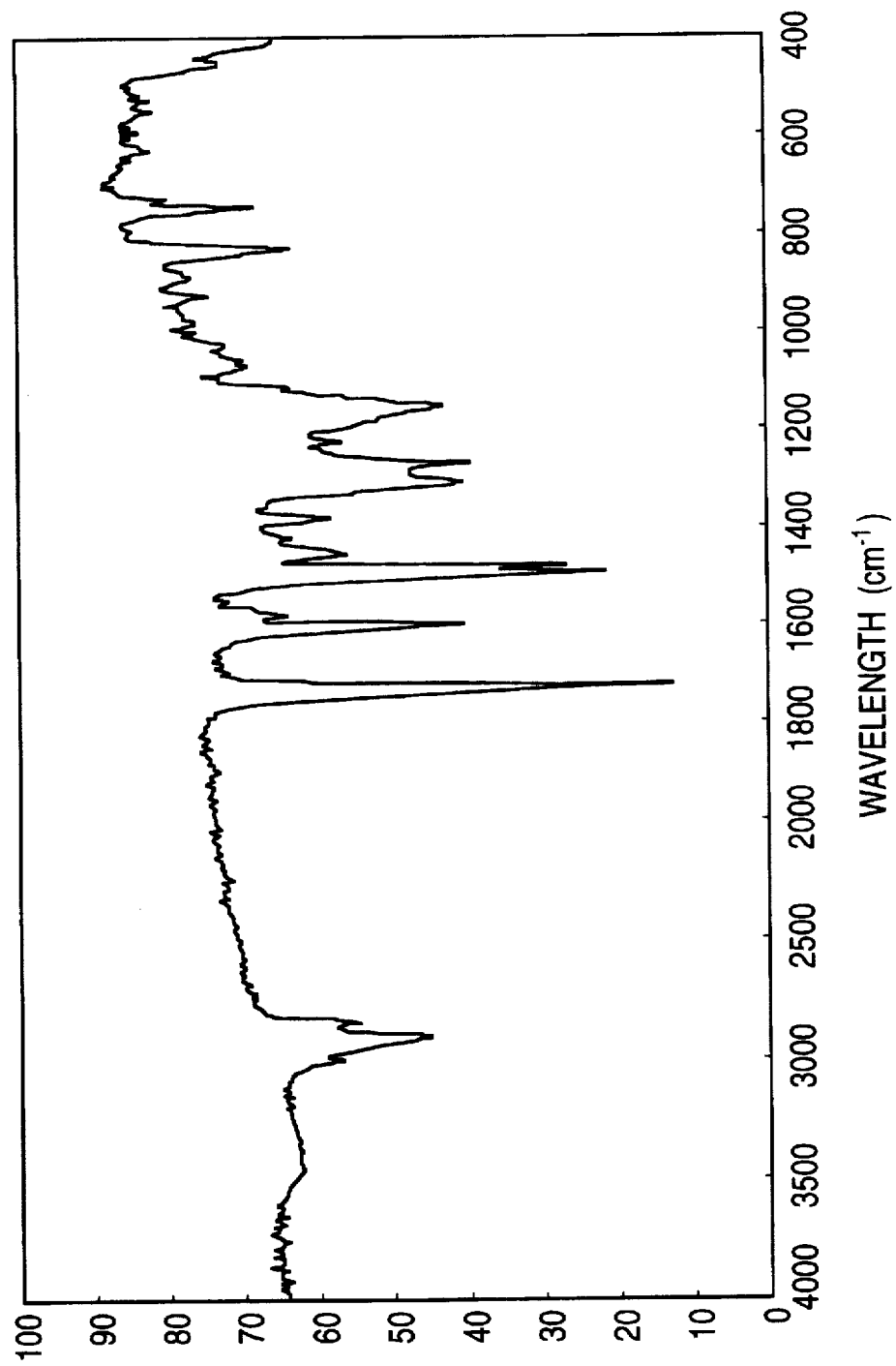
FIG. 8 is an IR spectrum of the charge transporting polyester resin prepared in Example 1.

In a 300 ml-volume flask, 15.0 g of 3,3'-dimethyl-N,N'-bis(3,4-dimethylphenyl)-N,N'-bis[4-(2-methoxycarbonylethyl)phenyl]-[1,1'-biphenyl]-4,4,-diamine, 3.0 g of dimethyl sebacate, 30.0 g of ethylene glycol and 0.1 g of tetrabutoxy titanium were placed, and the mixture was refluxed under heating for 3 hours in a nitrogen stream. After confirming consumption of 3,3'-dimethyl-N, N'-bis(3,4-dimethylphenyl)-N,N'-bis[4-(2-methoxycarbonylethyl)phenyl]-[1,1'-biphenyl]-4,4'-diamine, the pressure was reduced to 0.5 mmHg, and while distilling off ethylene glycol, the mixture was heated at 230° C. and continued to react for 3 hours. Thereafter, the system was cooled to room temperature, the reaction mixture was dissolved in 200 ml of methylene chloride, insoluble matters were filtered and the filtrate was added dropwise to 1,400 ml of ethanol under stirring to precipitate a polymer. The resulting polymer was filtered, thoroughly washed with ethanol and dried to obtain 16.5 g of the polymer. As a result of measuring of the molecular weight by GPC, the polymer had an Mw of $1.45 \times 10^5$ (styrene standard) (polymerization degree: q=about 160, r=about 105). The IR spectrum of the polymer is shown in FIG. 8.

EXAMPLE 2

Synthesis of Charge Transporting Polyester Resin (CTP-17)

Figure 9:
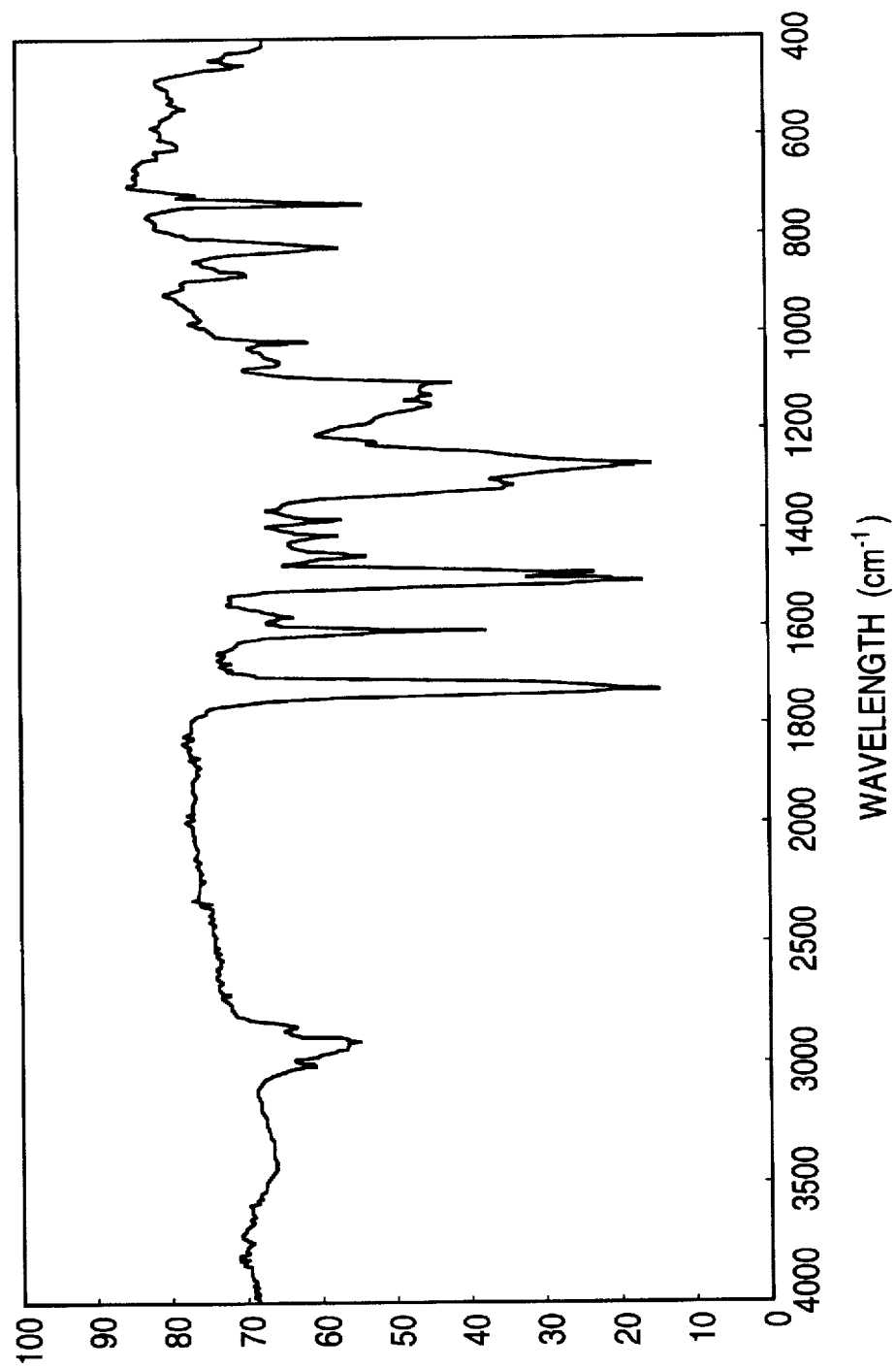
FIG. 9 is an IR spectrum of the charge transporting polyester resin prepared in Example 2.

In a 300 ml-volume flask, 15.0 g of 3,3'-dimethyl-N,N'-bis(3,4-dimethylphenyl)-N,N'-bis[4-(2-methoxycarbonylethyl)phenyl]-[1,1'-biphenyl]-4,4'-diamine, 3.0 g of dimethyl terephthalate, 30.0 g of ethylene glycol and 0.1 g of tetrabutoxy titanium were placed, and the mixture was refluxed under heating for 3 hours in a nitrogen stream. After confirming consumption of 3,3'-dimethyl-N, N'-bis(3,4-dimethylphenyl)-N,N'-bis[4-(2-methoxycarbonylethyl)phenyl]-[1,1'-biphenyl]-4,4'-diamine, the pressure was reduced to 0.5 mmHg, and while distilling off ethylene glycol, the mixture was heated at 235° C. and continued to react for 2.5 hours. Thereafter, the system was cooled to room temperature, the reaction mixture was dissolved in 200 ml of methylene chloride, insoluble matters were filtered, and the filtrate was added dropwise to 1,400 ml of ethanol under stirring to precipitate a polymer. The resulting polymer was filtered, thoroughly washed with ethanol and dried to obtain 17.0 g of the polymer. As a result of measuring of the molecular weight by GPC, the polymer had an Mw=$1.40 \times 10^5$ (styrene standard) (polymerization degree: q=about 150, r=about 120). The IR spectrum of the polymer is shown in FIG. 9.

EXAMPLE 3

Synthesis of Charge Transporting Polyester Resin (CTP-15)

Figure 10:
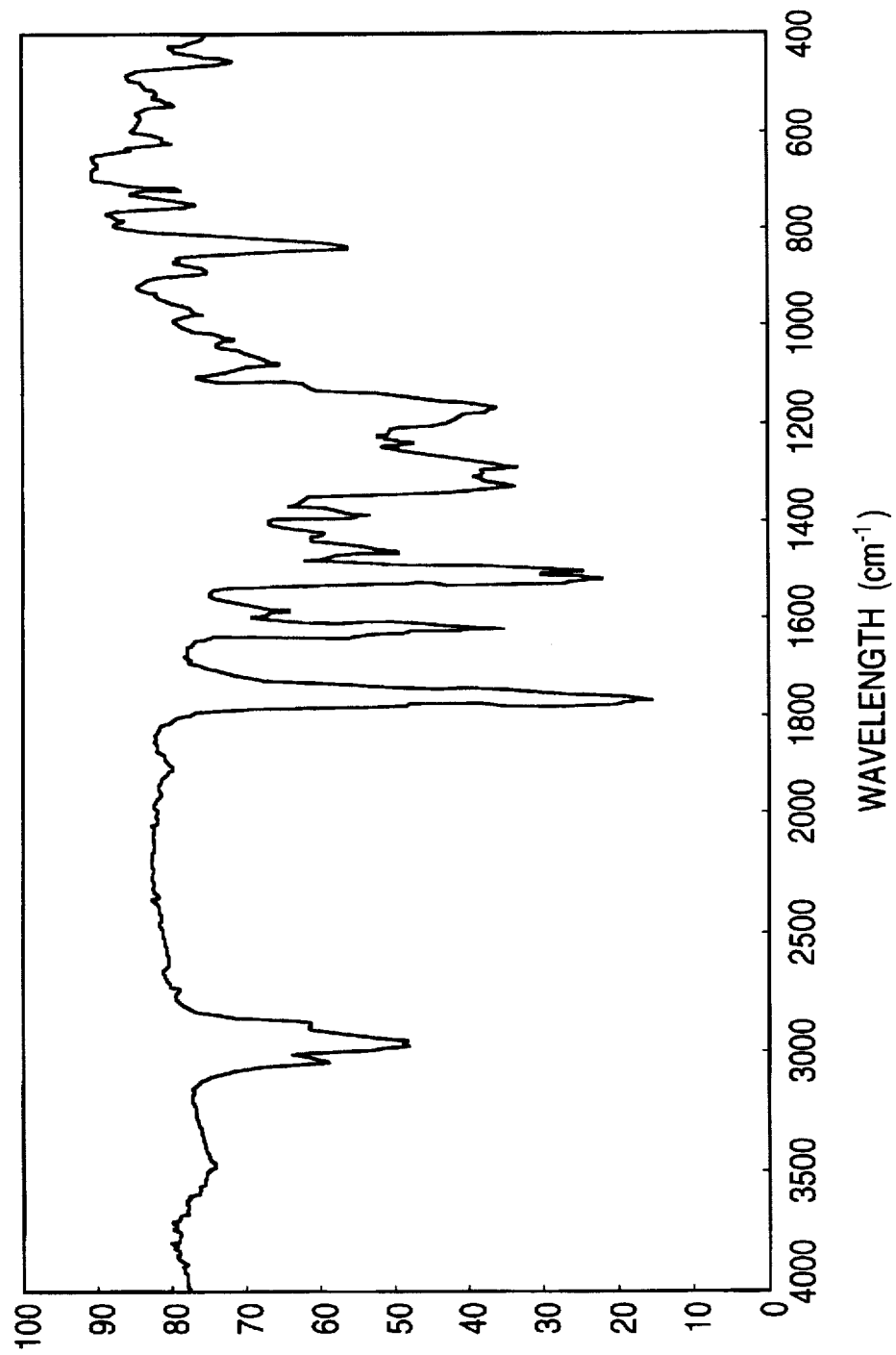
FIG. 10 is an IR spectrum of the charge transporting polyester resin prepared in Example 3.

In a 300 ml-volume flask, 15.0 g of 3,3'-dimethyl-N,N'-bis(3,4-dimethylphenyl)-N,N'-bis[4-(2-methoxycarbonylethyl)phenyl]-[1,1'-biphenyl]-4,4'-diamine, 3.0 g of dimethyl adipate, 30.0 g of ethylene glycol and 0.1 g of tetrabutoxy titanium were placed, and the mixture was refluxed under heating for 3 hours in a nitrogen stream. After confirming consumption of 3,3'-dimethyl-N, N'-bis(3,4-dimethylphenyl)-N,N'-bis[4-(2-methoxycarbonylethyl)phenyl]-[1,1'-biphenyl]-4,4'-diamine, the pressure was reduced to 0.5 mmHg, and while distilling off ethylene glycol, the mixture was heated at 235° C. and continued to react for 3 hours. Thereafter, the system was cooled to room temperature, the reaction mixture was dissolved in 200 ml of methylene chloride, insoluble matters were filtered, and the filtrate was added dropwise to 1,400 ml of ethanol under stirring to precipitate a polymer. The resulting polymer was filtered, thoroughly washed with ethanol and then dried to obtain 17.0 g of polymer. As a result of measuring of the molecular weight by GPC, the polymer had an Mw=$1.30 \times 10^5$ (styrene standard) (polymerization degree: q=about 145, r=about 125). The IR spectrum of the polymer is shown in FIG. 10.

Other charge transporting polyester resins were synthesized in the same manner by varying the combination of the above-described charge transporting monomer and the dicarboxylic acid represented by formula (II) as shown in Tables 11 to 14.

EXAMPLE 4

A 30-mm diameter aluminum cylindrical substrate subjected to honing treatment was coated with a solution comprising 100 parts of a zirconium compound (Orgatics ZC540, trade name, produced by Matsumoto Seiyaku K. K.), 10 parts of a silane compound (A1110, trade name, produced by Nippon Unicar Co., Ltd.), 400 parts of i-propanol and 200 parts of butanol by dip coating and then dried under heating at 150° C. for 10 minutes to form a undercoat layer having a thickness of 0.5 μm. Ten parts of CG-1 were mixed with 10 parts of polyvinyl butyral resin (Es-Lec BM-S, trade name, produced by Sekisui Chemical Co., Ltd.) and 500 parts of n-butyl acetate, the mixture was treated together with glass beads in a paint shaker for one hour to disperse the crystals in the solvent. The resulting coating solution was applied onto the undercoat layer formed above by dip coating and then dried under heating at 100° C. for 10 minutes.

Then, 5 parts of the charge transporting polyester resin (CTP-16) was dissolved in 38 parts of monochlorobenzene, and the resulting coating solution was applied by dip coating onto the aluminum cylindrical substrate having formed thereon the charge generating layer, and dried under heating at 120° C. for one hour to form a charge transporting layer having a thickness of 15 μm.

The thus-obtained electrophotographic photoreceptor was subjected to a printing test using a laser beam printer (XP-11, manufactured by Fuji Xerox Co., Ltd.) under conditions of an ordinary temperature and an ordinary humidity (20° C., 40% RH), and the electrophotographic properties thereof were evaluated by examining the image quality of the first copy sheet and the 2,000th copy sheet. The results obtained are shown in Table 15.

EXAMPLES 5 TO 13

Electrophotographic photoreceptors were prepared and evaluated in the same manner as in Example 4 except for changing the charge transporting material (e.g., charge transporting polyester resin) of Example 4 as shown in Table 15. The results obtained are shown in Table 15.

TABLE 15

| | Charge Transporting Material | Image Quality 1st Copy | Image Quality 2,000th Copy |
|---|---|---|---|
| Example 4 | CTP-16 | good | good |
| Example 5 | CTP-17 | good | good |
| Example 6 | CTP-15 | good | good |
| Example 7 | CTP-22 | good | good |
| Example 8 | CTP-25 | good | good |
| Example 9 | CTP-34 | good | good |
| Example 10 | CTP-42 | good | good |
| Example 11 | CTP-53 | good | good |
| Example 12 | CTP-63 | good | good |
| Example 13 | CTP-69 | good | good |

EXAMPLE 14

A 30-mm diameter aluminum cylindrical substrate subjected to honing treatment was coated with a solution comprising 100 parts of a zirconium compound (Orgatics ZC540, trade name, produced by Matsumoto Seiyaku K. K.), 10 parts of a silane compound (A1110, trade name, produced by Nippon Unicar Co., Ltd.), 400 parts of i-propanol and 200 parts of butanol by dip coating and then dried under heating at 150° C. for 10 minutes to form a undercoat layer having a thickness of 0.5 μm. Ten parts of CG-1 were mixed with 10 parts of polyvinyl butyral resin (Es-Lec BM-S, trade name, produced by Sekisui Chemical Co., Ltd.) and 500 parts of n-butyl acetate, the mixture was treated together with glass beads in a paint shaker for one hour to disperse the crystals in the solvent. The resulting coating solution was applied onto the undercoat layer formed above by dip coating and then dried under heating at 100° C. for 10 minutes.

Then, 5 parts of the charge transporting polyester resin (CTP-16) was dissolved in 38 parts of monochlorobenzene, and the resulting coating solution was applied by dip coating onto the aluminum cylindrical substrate having formed thereon the charge generating layer, and dried under heating at 120° C. for one hour to form a charge transporting layer having a thickness of 15 μm.

The thus-obtained electrophotographic photoreceptor was subjected to a printing test using a laser beam printer (XP-11, manufactured by Fuji Xerox Co., Ltd.) under conditions of a high temperature and a high humidity (35° C., 80% RH), and the electrophotographic properties thereof were evaluated by examining the image quality of the first copy sheet and the 2,000th copy sheet. The results obtained are shown in Table 16.

EXAMPLES 15 TO 37

Electrophotographic photoreceptors were prepared and evaluated in the same manner as in Example 14 except for changing the combination of the charge generating material and the charge transporting material (e.g., charge transporting polyester resin) of Example 14 as shown in Table 16. The results obtained are shown in Table 16.

REFERENCE EXAMPLE 1

Synthesis of Alternating Copolymer

In a 50 ml-volume flask, 1.03 g of N, N'-diphenyl-N,N'-bis[3-(2-ethoxycarbonylethyl)phenyl]-[1,1'-biphenyl]-4,4'-diamine, 2.0 g of ethylene glycol and 0.06 g of tetrabutoxy titanium were placed, and the mixture was refluxed under heating for 3 hours in a nitrogen stream. After confirming consumption of N,N'-diphenyl-N,N'-bis[3-(2-ethoxycarbonylethyl)phenyl]-[1,1'-biphenyl]-4,4'-diamine, the pressure was reduced to 0.5 mmHg and ethylene glycol was distilled off. Thereafter, the system was cooled to room temperature, the reaction mixture was dissolved in 20 ml of methylene chloride, and a solution of 0.30 g of isophthalic acid dichloride dissolved in 10 ml of methylene chloride was added dropwise. Further, 0.61 g of triethylamine was added thereto, and the mixture was refluxed under heating for 30 minutes. Then, 0.3 ml of methanol was added, the mixture was further refluxed under heating for 30 minutes, insoluble matters were filtered, and the filtrate was added dropwise to 300 ml of ethanol under stirring to precipitate a polymer. After filtration, the polymer obtained was again dissolved in 50 ml of THF and the solution was added dropwise to 300 ml of water under stirring to precipitate a polymer. The polymer precipitated was thoroughly washed with water and then dried to obtain 0.52 g of the polymer. As a result of measuring of the molecular weight of the resulting polymer by GPC, the polymer had an Mw=1.60×10$^4$ (styrene standard) and a polymerization degree, p=about 20.

REFERENCE EXAMPLE 2

Synthesis of Alternating Copolymer

In a 50 ml-volume flask, 2.0 g of 3,3'-dimethyl-N, N'-bis (3,4-dimethylphenyl)-N,N'-bis[4-(2-methoxycarbonylethyl)

phenyl]-[1,1'-biphenyl]-4,4'-diamine, 4.0 g of ethylene glycol and 0.1 g of tetrabutoxy titanium were placed, and the mixture was refluxed under heating for 3 hours in a nitrogen stream. After confirming consumption of 3,3'-dimethyl-N, N'-bis(3,4-dimethylphenyl)-N,N'-bis[4-(2-methoxycarbonylethyl)phenyl]-[1,1'-biphenyl]-4,4'-diamine, the pressure was reduced to 0.5 mmHg and while distilling off ethylene glycol, the mixture was heated at 230° C. and continued to react for 3 hours. Thereafter, the system was cooled to room temperature, the reaction mixture was dissolved in 50 ml of methylene chloride, insoluble matters were filtered, and the filtrate was added to 250 ml of ethanol under stirring to precipitate a polymer. The resulting polymer was filtered, thoroughly washed with ethanol and dried to obtain 1.9 g of the polymer. As a result of measuring of the molecular weight of the thus-obtained polymer by GPC, the polymer had an $Mw=1.23\times10^5$ (styrene standard) (polymerization degree: p=about 160).

COMPARATIVE EXAMPLES 1 AND 2

Electrophotographic photoreceptors were prepared and evaluated in the same manner as in Example 14 except for using a charge transporting polymer synthesized in Reference Example 1 or 2. The results obtained are shown in Table 16.

TABLE 16

| | Charge Transporting Material | Charge Generating Material | Image Quality 1st Copy | Image Quality 2,000th Copy |
|---|---|---|---|---|
| Example 14 | CTP-16 | CG-1 | good | good |
| Example 15 | CTP-7 | CG-1 | good | good |
| Example 16 | CTP-10 | CG-2 | good | good |
| Example 17 | CTP-15 | CG-1 | good | good |
| Example 18 | CTP-15 | CG-2 | good | good |
| Example 19 | CTP-15 | CG-3 | good | good |
| Example 20 | CTP-15 | CG-4 | good | good |
| Example 21 | CTP-17 | CG-1 | good | good |
| Example 22 | CTP-17 | CG-3 | good | good |
| Example 23 | CTP-18 | CG-1 | good | good |
| Example 24 | CTP-22 | CG-2 | good | good |
| Example 25 | CTP-23 | CG-2 | good | good |
| Example 26 | CTP-25 | CG-4 | good | good |
| Example 27 | CTP-28 | CG-4 | good | good |
| Example 28 | CTP-34 | CG-1 | good | good |
| Example 29 | CTP-34 | CG-2 | good | good |
| Example 30 | CTP-34 | CG-3 | good | good |
| Example 31 | CTP-34 | CG-4 | good | good |
| Example 32 | CTP-42 | CG-1 | good | good |
| Example 33 | CTP-48 | CG-3 | good | good |
| Example 34 | CTP-56 | CG-2 | good | good |
| Example 35 | CTP-56 | CG-3 | good | good |
| Example 36 | CTP-63 | CG-4 | good | good |
| Example 37 | CTP-69 | CG-4 | good | good |
| Comparative Example 1 | Reference Example 1 | CG-1 | good | partly smeared |
| Comparative Example 2 | Reference Example 2 | CG-1 | good | smeared |

The charge transporting polyester resin of the present invention is a random copolymer obtained using a monomer having a specific structural unit, of which the physical properties such as the mechanical properties, antioxidation property and charge injection property can be controlled by selecting appropriate partial structures for the monomers. Accordingly, the charge transporting random copolyester resin is useful as a charge transporting material to produce organic electronic devices. According to the process for producing the charge transporting polyester resin of the present invention, a charge transporting polymer having a high molecular weight is easily obtained from the above-described monomers in a high yield. Furthermore, electrophotographic photoreceptors produced using the above-described charge transporting random copolyester resin of the present invention exhibit high photosensitivity and excellent stability to repeated use.

While the invention has been described in detail and with reference to specific embodiments thereof, it will be apparent to one skilled in the art that various changes and modifications can be made therein without departing from the spirit and scope thereof.

What is claimed is:

1. A charge transporting random copolyester resin comprising a repeating unit comprising at least one partial structural unit represented by formula (I-1) or (I-2), and at least one partial structural unit represented by formula (II) as a dicarboxylic acid component:

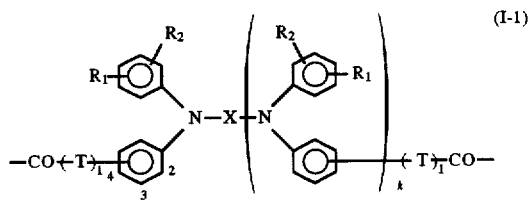

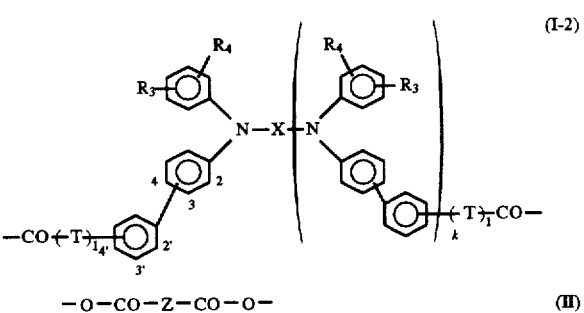

$$-O-CO-Z-CO-O- \quad (II)$$

wherein $R_1$ to $R_4$ each independently represents a hydrogen atom, an alkyl group, an alkoxy group, a substituted amino group, a halogen atom, or a substituted or unsubstituted aryl group; X represents a substituted or unsubstituted divalent aromatic group; T represents a linear or branched divalent hydrocarbon group having from 1 to 10 carbon atoms; k and l each represents an integer of 0 or 1; Z represents a divalent hydrocarbon group.

2. A charge transporting random copolyester resin as claimed in claim 1, which is represented by formula (III):

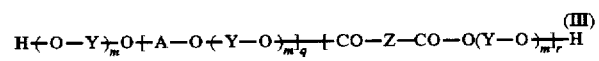

wherein A represents a structure represented by formula (I-1) or (I-2); Y and Z each independently represents a divalent hydrocarbon group; m represents an integer of from 1 to 5; q represents an integer of 1 or greater; and r represents an integer of from 1 to 3,500, provided that q+r is an integer of from 5 to 5,000 and $0.3 \leq q/(q+r) < 1$.

3. A process for producing a charge transporting random copolyester resin comprising a repeating unit comprising at least one partial structural unit represented by formula (I-1) or (I-2), and at least one partial structural unit represented by formula (II) as a dicarboxylic acid component:

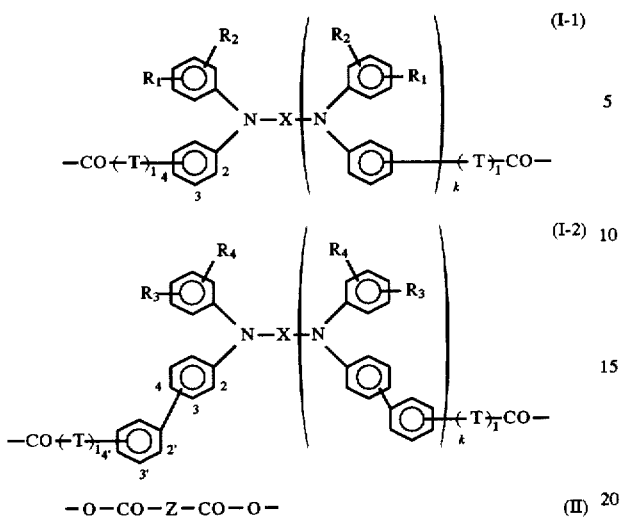

$$-O-CO-Z-CO-O- \quad (II)$$

wherein $R_1$ to $R_4$ each independently represents a hydrogen atom, an alkyl group, an alkoxy group, a substituted amino group, a halogen atom, or a substituted or unsubstituted aryl group; X represents a substituted or unsubstituted divalent aromatic group; T represents a linear or branched divalent hydrocarbon group having 1 to 10 carbon atoms; k and l each represents an integer of 0 or 1; Z represents a divalent hydrocarbon group, the process comprising synthesizing a charge transporting polyester resin by transesterification using at least one dicarboxylic ester having a structure represented by formula (I-1) or (I-2), at least one dicarboxylic ester having a structure represented by formula (II), and a diol having a structure represented by H—(O—Y)$_m$—OH.

4. A process for producing a charge transporting random copolyester resin represented by formula (III):

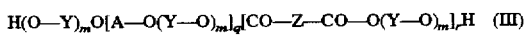

wherein A represents a structure represented by formula (I-1) or (i-2)

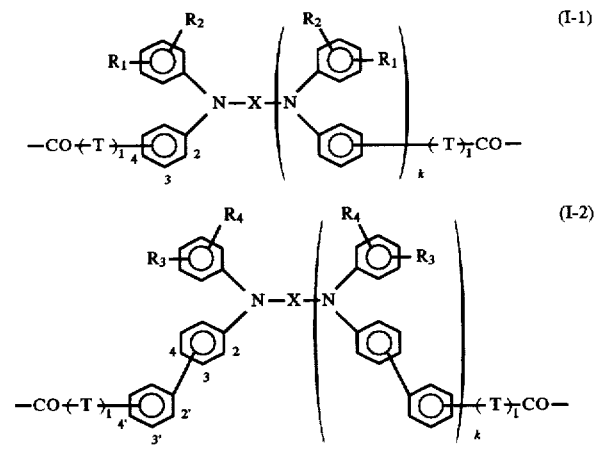

wherein $R_1$ to $R_4$ each independently represents a hydrogen atom, an alkyl group, an alkoxy group, a substituted amino group, a halogen atom, or a substituted or unsubstituted aryl group; X represents a substituted or unsubstituted divalent aromatic group; T represents a linear or branched divalent hydrocarbon group having 1 to 10 carbon atoms; k and l each represents an integer of 0 or 1; Y and Z each independently represents a divalent hydrocarbon group; m represents an integer of from 1 to 5; q represents an integer of 1 or greater; and r represents an integer of from 1 to 3,500, provided that q+r is an integer of from 5 to 5,000 and $0.3 \leq q/(q+r) < 1$, the process comprising synthesizing a charge transporting random copolyester resin by transesterification using at least one dicarboxylic ester having a structure represented by formula (I-1) or (I-2), at least one dicarboxylic ester having a structure represented by formula (II), and a diol having a structure represented by H—(O—Y)$_m$—OH.

5. An organic electronic device comprising a conducting support having thereon a layer comprising a charge transporting random copolyester resin comprising a repeating unit comprising at least one partial structural unit represented by formula (I-1) or (I-2), and at least one partial structural unit represented by formula (II) as a dicarboxylic acid component:

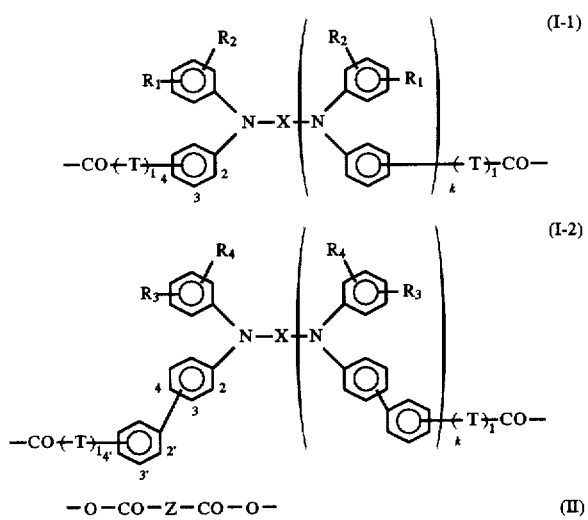

$$-O-CO-Z-CO-O- \quad (II)$$

wherein $R_1$ to $R_4$ each independently represents a hydrogen atom, an alkyl group, an alkoxy group, a substituted amino group, a halogen atom or a substituted or unsubstituted aryl group; X represents a substituted or unsubstituted divalent aromatic group; T represents a divalent hydrocarbon group having from 1 to 10 carbon atoms, which may be branched; and k and l each represents 0 or 1; Z represents a divalent hydrocarbon group.

6. An organic electronic device as claimed in claim 5, wherein X in formula (I-1) or (I-2) is a biphenylene group or a 3,3'-dimethylbiphenylene group.

7. An organic electronic device as claimed in claim 5, further comprising a substantially insulating polymer compatible with said charge transporting polyester resin.

8. An organic electronic device as claimed in claim 5, wherein said organic electronic device is a charge transporting random copolyester resin represented by formula (III):

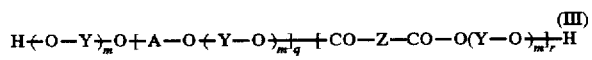

wherein A represents a structure represented by formula (I-1) or (I-2); Y and Z each independently represents a divalent hydrocarbon group; m represents an integer of from 1 to 5; q represents an integer of 1 or greater; and r represents an integer of from 1 to 3,500, provided that q+r is an integer of from 5 to 5,000 and $0.3 \leq q/(q+r) < 1$.

9. An organic electronic device as claimed in claim 5, wherein said organic electronic device is an electrophotographic photoreceptor comprising a conductive support having thereon a photosensitive layer comprising said charge transporting random copolyester resin.

10. An organic electronic device as claimed in claim 9, wherein said charge transporting random copolyester resin in said photosensitive layer is represented by formula (III):

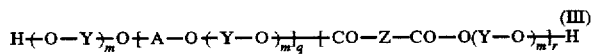
(III)

wherein A represents a structure represented by formula (I-1) or (I-2); Y and Z each independently represents a divalent hydrocarbon group; m represents an integer of from 1 to 5; q represents an integer of 1 or greater; and r represents an integer of from 1 to 3,500, provided that q+r is an integer of from 5 to 5,000 and $0.3 \leq q/(q+r) < 1$.

11. An organic electronic device as claimed in claim 9, wherein said photosensitive layer comprises a plurality of layers, and the outermost layer of said photosensitive layer comprises said charge transporting random copolyester resin.

12. An organic electronic device as claimed in claim 10, wherein said photosensitive layer comprises a plurality of layers, and the outermost layer of said photosensitive layer comprises said charge transporting random copolyester resin.

13. An organic electronic device as claimed in claim 9, wherein said photosensitive layer further comprises a charge generating material selected from the group consisting of a halogenogallium phthalocyanine crystal, a halogenotin phthalocyanine crystal, a hydroxygallium phthalocyanine crystal and an oxotitanium phthalocyanine crystal.

* * * * *